US012722241B2

(12) United States Patent
Tanaka et al.

(10) Patent No.: US 12,722,241 B2
(45) Date of Patent: Sep. 1, 2026

(54) CUTTING MACHINING DEVICE

(71) Applicant: NISSIN FULFIL CO., LTD., Kyoto (JP)

(72) Inventors: Koji Tanaka, Kyoto (JP); Shuhei Muraoka, Kyoto (JP); Hidekazu Tsuji, Kyoto (JP); Ryosuke Yamazoe, Kyoto (JP); Kenji Inoue, Kyoto (JP); Akira Nishikohri, Kyoto (JP)

(73) Assignee: NISSIN FULFIL CO., LTD., Kyoto (JP)

( * ) Notice: Subject to any disclaimer, the term of this patent is extended or adjusted under 35 U.S.C. 154(b) by 301 days.

(21) Appl. No.: 18/707,339

(22) PCT Filed: Nov. 4, 2022

(86) PCT No.: PCT/JP2022/041225
§ 371 (c)(1),
(2) Date: May 3, 2024

(87) PCT Pub. No.: WO2023/080209
PCT Pub. Date: May 11, 2023

(65) Prior Publication Data

US 2025/0025973 A1 Jan. 23, 2025

(30) Foreign Application Priority Data

Nov. 5, 2021 (JP) ................................ 2021-180963

(51) Int. Cl.
*B23Q 15/12* (2006.01)

(52) U.S. Cl.
CPC .................................. *B23Q 15/12* (2013.01)

(58) Field of Classification Search
CPC ........ B23Q 15/12; B23Q 3/155; B23Q 3/157; B23Q 17/22
See application file for complete search history.

(56) References Cited

U.S. PATENT DOCUMENTS 3,797,422 A * 3/1974 Sakawa .................. D05B 23/00 112/70
2017/0038760 A1* 2/2017 Compagnat ............ B24B 49/10
(Continued)

FOREIGN PATENT DOCUMENTS

JP S48-23942 B1 7/1973
JP S57100434 U 6/1982
(Continued)

OTHER PUBLICATIONS

International Search Report and Written Opinion; International Application No. PCT/JP2022/041225; Dec. 27, 2022.

*Primary Examiner* — Ziaul Karim
(74) *Attorney, Agent, or Firm* — Ohlandt, Greeley and Perle, L.L.P.

(57) ABSTRACT

A cutting machining device includes a head, a holding unit, and a controller. The holding unit includes a workpiece holding portion, a contact plug—that a tool fixed to the head is contactable, a cover having a box shape and having a first opening in which the contact plug—is detachably held in a position separated from a fixed section of the workpiece holding portion in a surrounding wall, and a touch sensor that detects contact of a tip portion of the tool with the contact plug. The controller includes a calculator that calculates a machining start position by the tool, based on an initial position of the head and a contact position of the head which is detected by using the touch sensor, when the tip portion of the tool comes into contact with the contact plug.

20 Claims, 19 Drawing Sheets

(56) References Cited

U.S. PATENT DOCUMENTS

| | | | | |
|---|---|---|---|---|
| 2019/0270157 | A1* | 9/2019 | Kishikawa | B23K 9/0213 |
| 2020/0130120 | A1* | 4/2020 | Natsuda | B23F 19/104 |
| 2021/0158716 | A1* | 5/2021 | Becker | G09B 9/00 |

FOREIGN PATENT DOCUMENTS

| | | | |
|---|---|---|---|
| JP | S6274943 | U | 5/1987 |
| JP | S63201041 | U | 12/1988 |
| JP | H06-39686 | A | 2/1994 |
| JP | 2002-126977 | A | 5/2002 |
| JP | 2004090199 | A | 3/2004 |
| JP | 2009-136954 | A | 6/2009 |
| JP | 2013-6257 | A | 1/2013 |

* cited by examiner

FIG.6A

POSITION STORAGE UNIT 132

| TOOL IDENTIFICATION INFORMATION | TOOL HOLDING POSITION | RELATIVE DISTANCE | MACHINING START POSITION (HORIZONTAL TO C-AXIS) | MACHINING START POSITION (VERTICAL TO C-AXIS) |
|---|---|---|---|---|
| IDT[0] | (X[0], Y[0]) | 25mm | 35mm | 15mm |
| IDT[1] | (X[1], Y[1]) | 24mm | 34mm | 14mm |
| IDT[2] | (X[2], Y[2]) | 28mm | 38mm | 18mm |

X
Y
Z
31
Pos0 (0, 0)
311a
PosT2 (X[2], Y[2])
311b
JB
32
W
PosT1 (X[1], Y[1])
311b
311b
PosT0 (X[0], Y[0])

CUTTING MACHINING DEVICE

CROSS-REFERENCE TO RELATED APPLICATIONS

This application is a national stage application, filed under 35 U.S.C. § 371, of International Patent Application No. PCT/JP2022/041225 filed Nov. 4, 2022, which claims the benefit of Japanese Patent Application No. JP2021-180963 filed Nov. 5, 2021, the entire disclosures of which are incorporated herein by reference for all purposes.

TECHNICAL FIELD

The present disclosure relates to a cutting machining device.

BACKGROUND

A screw for bonding bones together is manufactured by performing cutting machining on a bone fragment acquired by cutting a bone of a patient himself/herself, and a broken bone portion of the patient is bonded by the screw. Thus, an attempt is being made to make a further operation for removing the screw after the broken bone portion adheres unnecessary and to greatly reduce a load on the patient. In this case, it is required to reduce a load on the patient by minimizing the size of the bone fragment cut from the bone of the patient for manufacturing the screw. Further, in general, it is important to improve matching accuracy of a screw created from a bone fragment in order to acquire excellent adhesion of a bone, and thus cutting machining of a bone fragment requires a high degree of machining accuracy. In contrast, a machining center has been proposed that can stably perform highly accurate machining by disposing a contact touch sensor in a machining region where machining of a workpiece is performed, and measuring a length of a tool used in machining, based on a position of a spindle when a tip portion of the tool is brought into contact with the touch sensor in the machining region (for example, see Patent Literature 1).

CITATION LIST

Patent Literature

Patent Literature 1: Utility Model Application Publication No. S62-74943

SUMMARY OF INVENTION

Technical Problem

From a viewpoint of preventing an infectious disease of a patient due to various germs adhering to a screw, contamination of a manufactured screw needs to be reduced as much as possible. However, in the machining center described in Patent Literature 1, foreign matter such as chips and dust adhering to a tool is accumulated on a contact surface of the touch sensor due to continuation of use. In this case, even when cutting machining is performed on a bone fragment by using a new tool, there is a risk that foreign matter may adhere to a tip portion of the tool when the tip portion of the tool is brought into contact with the contact surface of the touch sensor on which the foreign matter is accumulated, and contamination of a screw may occur due to machining of the bone fragment by the tool.

The present disclosure has been made in view of the reasons described above, and has an objective to provide a cutting machining device that can suppress contamination of a workpiece while achieving a high degree of machining accuracy.

Solution to Problem

In order to achieve the objective described above, a cutting machining device includes:

- a head to which one first tool is fixed;
- a holding unit that is disposed to face the head and holds a workpiece; and
- a controller that controls a movement of the head and the holding unit, wherein
- the holding unit includes
  - a workpiece holding portion that holds the workpiece,
  - a contact plug that a tip portion of the first tool fixed to the head is contactable,
  - a cover having a box shape, including a surrounding wall to which the workpiece holding portion is fixed, and having a first opening in which the contact plug is detachably held in a position separated from a fixed section to which the workpiece holding portion in the surrounding wall is fixed, and
  - a touch sensor that detects contact of a tip portion of the first tool with the contact plug, and
- the controller includes a calculator that calculates a machining start position when cutting machining is performed on the workpiece by the first tool, based on a preset initial position of the head and a contact position of the head, which is detected by using the touch sensor, when the tip portion of the first tool comes into contact with the contact plug.

Advantageous Effects of Invention

According to the present disclosure, the calculator of the controller calculates a machining start position when cutting machining is performed on the workpiece by the first tool, based on an initial position of the head and a contact position of the head, which is detected by using the touch sensor, when the tip portion of the first tool comes into contact with the contact plug. Further, the cover has a box shape, and has the first opening in which the contact plug is detachably held in the position separated from the fixed section to which the workpiece holding portion in the surrounding wall is fixed. In this way, a machining start position when cutting machining is performed on the workpiece by the first tool can be accurately calculated, and thus machining accuracy can be improved. Further, after the contact plug is used to some extent, the contact plug can be removed from the cover and the new contact plug can be attached to the cover, and thus contamination of the workpiece due to foreign matter accumulated on the contact plug can be suppressed.

BRIEF DESCRIPTION OF DRAWINGS

FIG. 6A is a diagram illustrating one example of information stored in a position storage according to the embodiment;

DESCRIPTION OF EMBODIMENTS

Hereinafter, a cutting machining device according to the embodiments of the present disclosure is described with reference to drawings. The cutting machining device according to the present embodiment includes a head to which one first tool is fixed, a holding unit that is disposed to face the head and holds a workpiece, and a controller that controls a movement of the head and the holding unit. Herein, the holding unit includes a workpiece holding portion that holds the workpiece, a contact plug that a tip portion of the first tool fixed to the head is contactable, a cover having a box shape, including a surrounding wall to which the workpiece holding portion is fixed, and having a first opening in which the contact plug is detachably held in a position separated from a fixed section to which the workpiece holding portion in the surrounding wall is fixed, and a touch sensor that detects contact of a tip portion of the first tool with the contact plug. Further, the holding unit includes a tool holding unit that holds at least one second tool different from the first tool inside the cover. The controller includes a calculator that calculates a machining start position when cutting machining is performed on the workpiece by the first tool, based on a preset initial position of the head and a contact position of the head, which is detected by using the touch sensor, when the tip portion of the first tool comes into contact with the contact plug.

Figure 1:
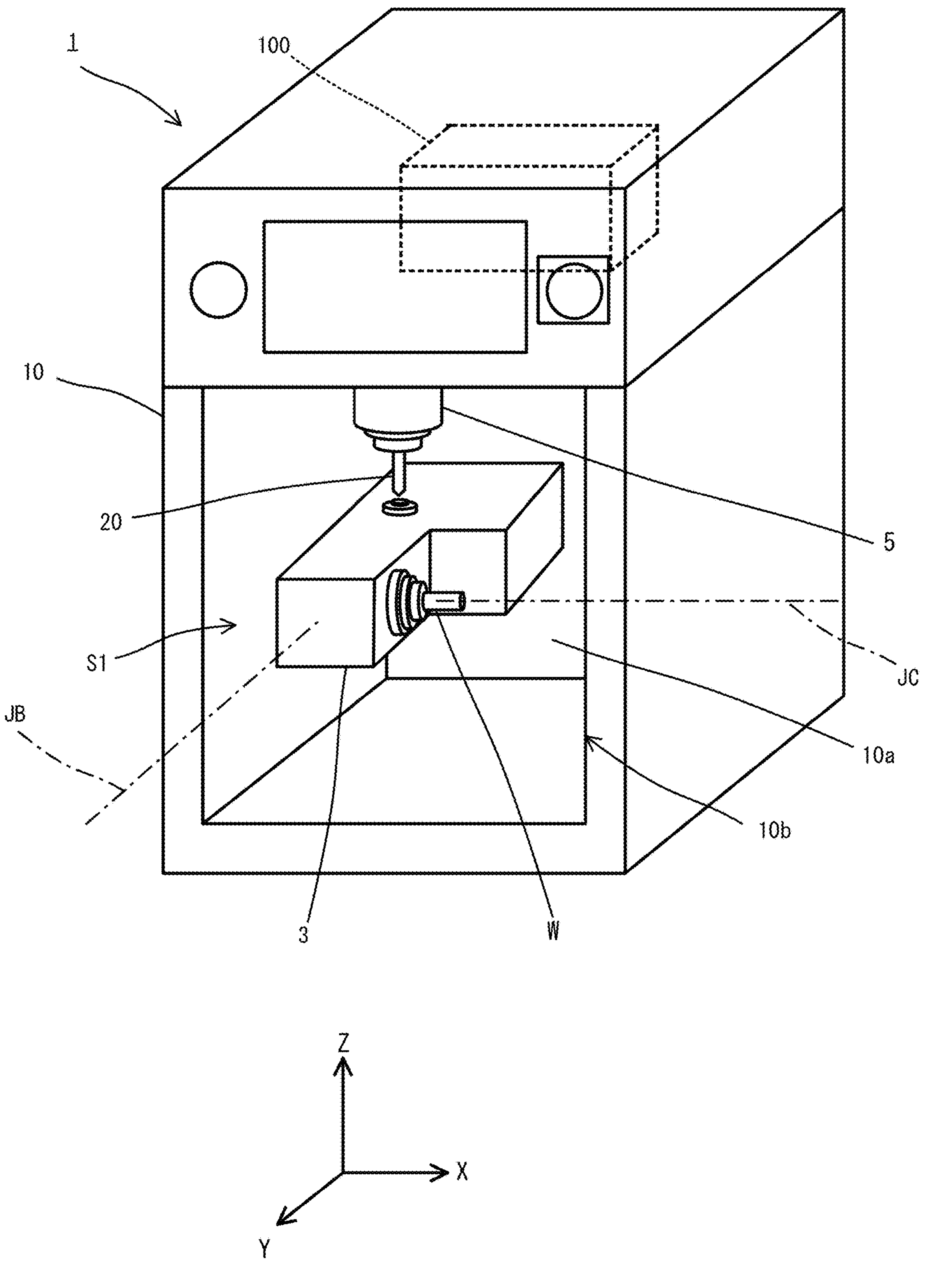
FIG. 1 is a schematic diagram of a cutting machining device according to an embodiment of the present disclosure.
Figure 2:
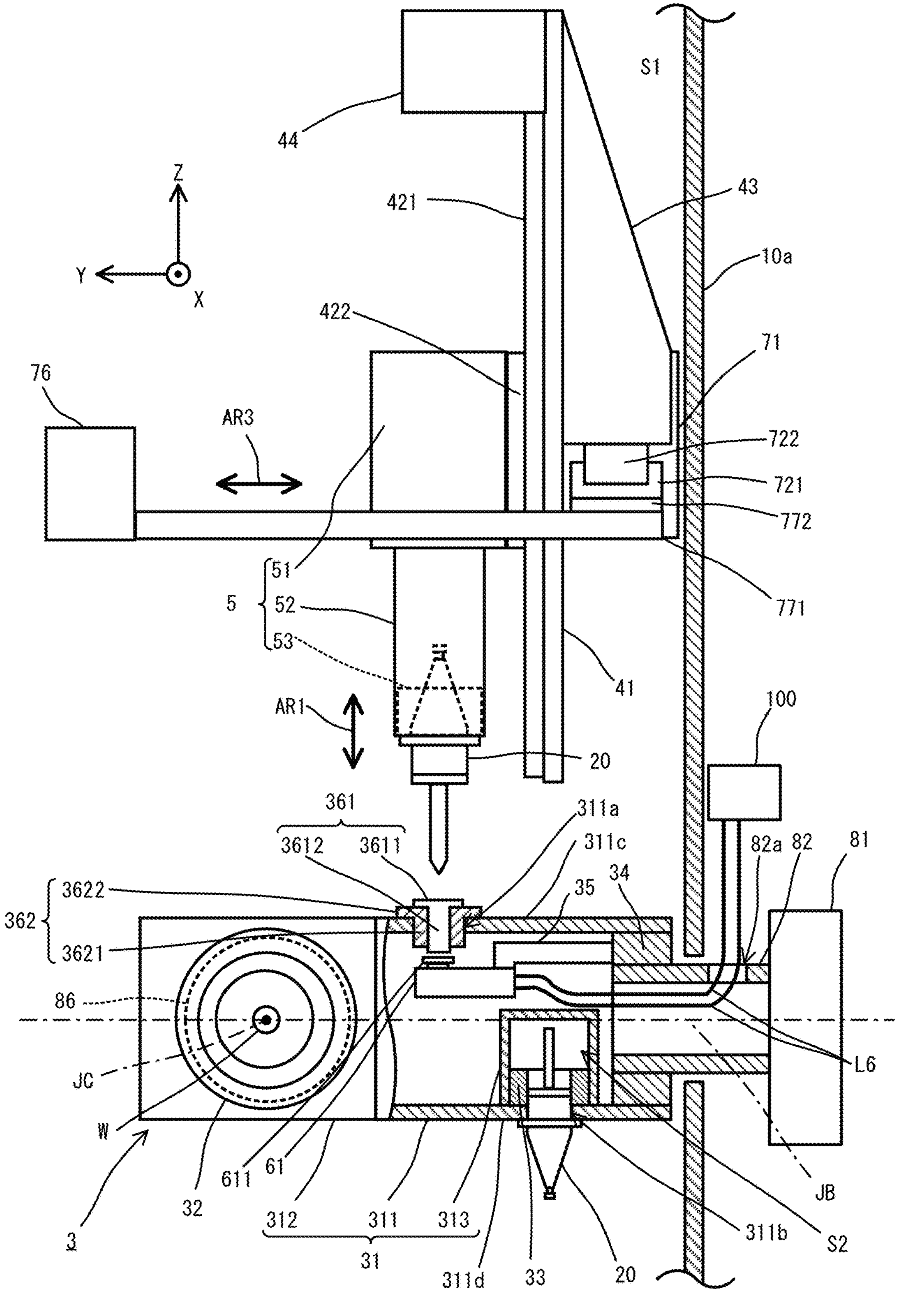
FIG. 2 is a cutaway side view of a part of the cutting machining device according to the embodiment.

As illustrated in FIG. 1, a cutting machining device 1 according to the present embodiment includes a head 5 to which a tool 20 is fixed, a holding unit 3 that is disposed to face the head 5 and holds a workpiece W, and a controller 100 that controls a movement of the head 5 and the holding unit 3. Further, the cutting machining device 1 includes a housing 10 that has a rectangular box shape, has an opening 10*b* for putting in and taking out the workpiece W in a side wall on a +Y direction side, and also houses the head 5, the holding unit 3, and the controller 100 inside. Furthermore, as illustrated in FIG. 2, the cutting machining device 1 includes a raising and lowering driving motor 44 that raises and lowers the head 5 in the vertical direction, an X-direction driving motor 71 that drives the head 5 along an X-axis direction, and a Y-direction driving motor 76 that drives the head 5 along a Y-axis direction. Further, the housing 10 includes a door (not illustrated) that covers the opening 10*b* from the +Y direction side. A machining region S1 where machining of the workpiece W is performed is formed inside the housing 10. The machining region S1 is surrounded by a partition wall 10*a* provided between the machining region S1 and a region other than the machining region S1 inside the housing 10.

The head 5 includes a main rotating shaft 52 that is long and is provided with, on one end portion in a longitudinal direction, a tool holding unit 53 that holds the tool 20, and a main shaft driving motor 51 that rotates the main rotating shaft 52 about a central axis along the longitudinal direction. The tool holding unit 53 includes a chuck (not illustrated) and an actuator (not illustrated) that drives the chuck, and the chuck opens and closes based on a control signal input from the controller 100. The head 5 is fixed to a slider 422 held to slide freely on a rail 421 extending along a Z-axis direction on the +Y direction side of a base 41. The raising and lowering driving motor 44 includes a motor coupled to a long ball screw (not illustrated) screwed on a nut portion (not illustrated) disposed along the Z-axis direction and provided on a part of the slider 422. Then, the raising and lowering driving motor 44 raises and lowers, along the Z-axis direction, the slider 422 and the head 5 fixed to the slider 422 by rotating the ball screw disposed along the Z-axis direction. Further, the raising and lowering driving motor 44 includes a position detection sensor for detecting a rotation amount of a rotor of the raising and lowering driving motor 44, and outputs a detection signal indicating a rotation amount of the raising and lowering driving motor 44 to the controller 100.

Further, the base 41 is fixed, via a bracket 43, to a slider 722 held to slide freely on a rail 721 extending along the X-axis direction. The X-direction driving motor 71 includes a motor coupled to a long ball screw (not illustrated) screwed on a nut portion (not illustrated) disposed along the X-axis direction and provided on a part of the bracket 43. Then, the X-direction driving motor 71 moves, along the X-axis direction, the slider 722 and the base 41 fixed to the slider 722 by rotating the ball screw disposed along the X-axis direction. In this way, the X-direction driving motor 71 moves the base 41 and the head 5 together via the ball screw along the X-axis direction. Further, the rail 721 is supported by a slider 772 held to slide freely on two rails 771 including both end portions in the longitudinal direction extending along the Y-axis direction. The Y-direction driving motor 76 includes a motor coupled to a long ball screw (not illustrated) screwed on a nut portion (not illustrated) disposed along the Y-axis direction and provided on a part of the base 41. Then, the Y-direction driving motor 76 moves, along the Y-axis direction, the slider 772 and the rail 721 supported by the slider 772 by rotating the ball screw disposed along the Y-axis direction. In this way, the Y-direction driving motor 76 moves the rail 721, the slider 722, the base 41, and the head 5 together via the ball screw along the Y-axis direction.

As illustrated in FIG. 2, the holding unit 3 includes a workpiece holding portion 32 that holds the workpiece W, a contact plug 361 that a tip portion of the tool 20 fixed to the head 5 is contactable, a cover 31 having a box shape, and a touch sensor 61. Further, the holding unit 3 includes an elastic support 362 that supports the contact plug 361, and a tool holding unit 33 that holds the tool 20 inside the cover 31. Furthermore, the holding unit 3 includes a rotation driving motor 81 that rotates the entire cover 31 about a rotation axis (hereinafter referred to as a "B-axis") JB extending in a longitudinal direction of the cover 31, and a rotation driving motor 86 that rotates the workpiece holding portion 32 about a rotation axis (hereinafter referred to as a "C-axis") JC extending in a direction orthogonal to the longitudinal direction of the cover 31.

The rotation driving motor 86 is disposed inside the cover 31, and rotates a shaft (not illustrated) extending along the C-axis and including a tip portion coupled to the workpiece holding portion 32. The rotation driving motor 81 supports an end portion on a −Y direction side of a hollow shaft 82 having a cylindrical shape and extending along the B axis, and rotates the hollow shaft 82 about the B-axis. A support member 34 that supports the cover 31 is fixed to an end portion on the +Y direction side of the hollow shaft 82. Further, an insertion hole 82*a* through which a signal line L6 connected to the controller 100 is inserted is provided in a side wall near the end portion on the −Y direction side of the hollow shaft 82. Herein, the rotation driving motor 81 is disposed in a region outside the machining region S1 being separated from the machining region S1 by the partition wall 10*a* inside the housing 10.

Figure 3A:
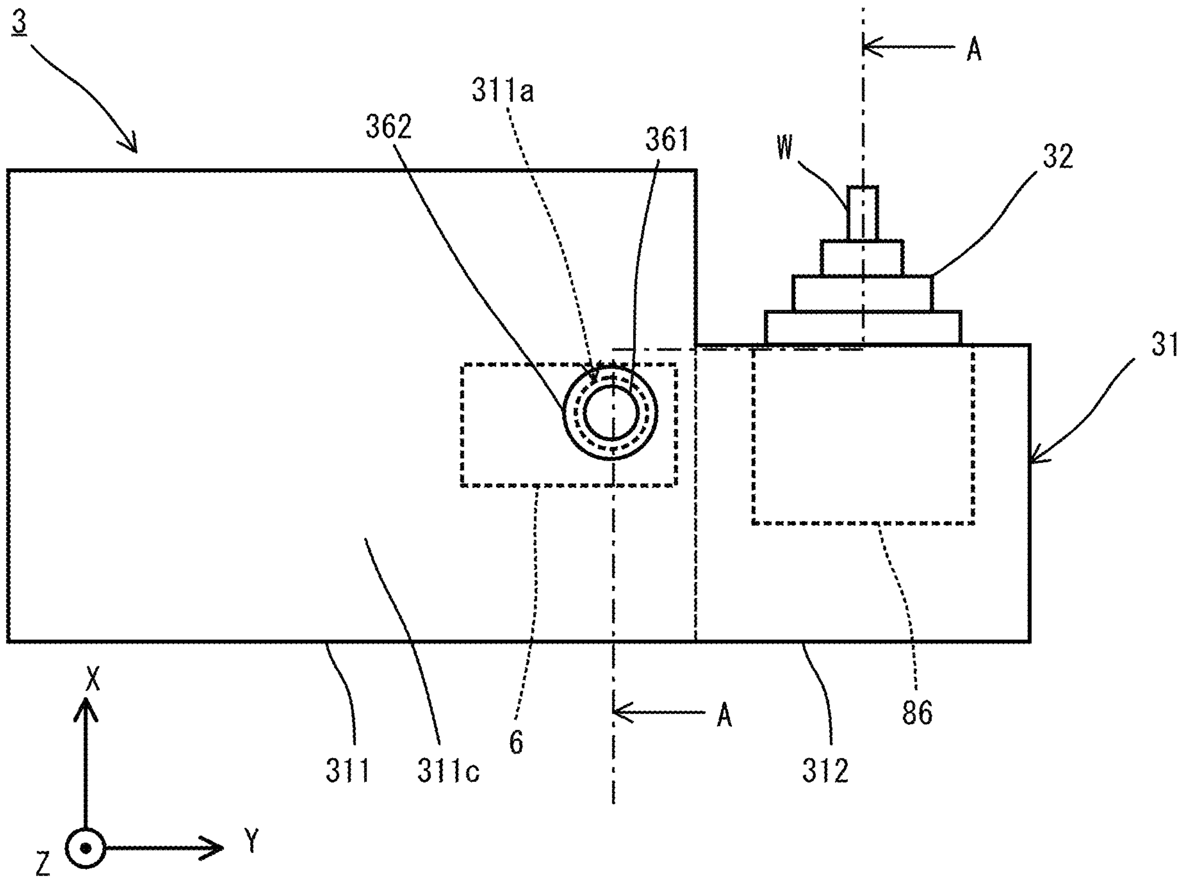
FIG. 3A is a plan view of a holding unit according to the embodiment.
Figure 3B:
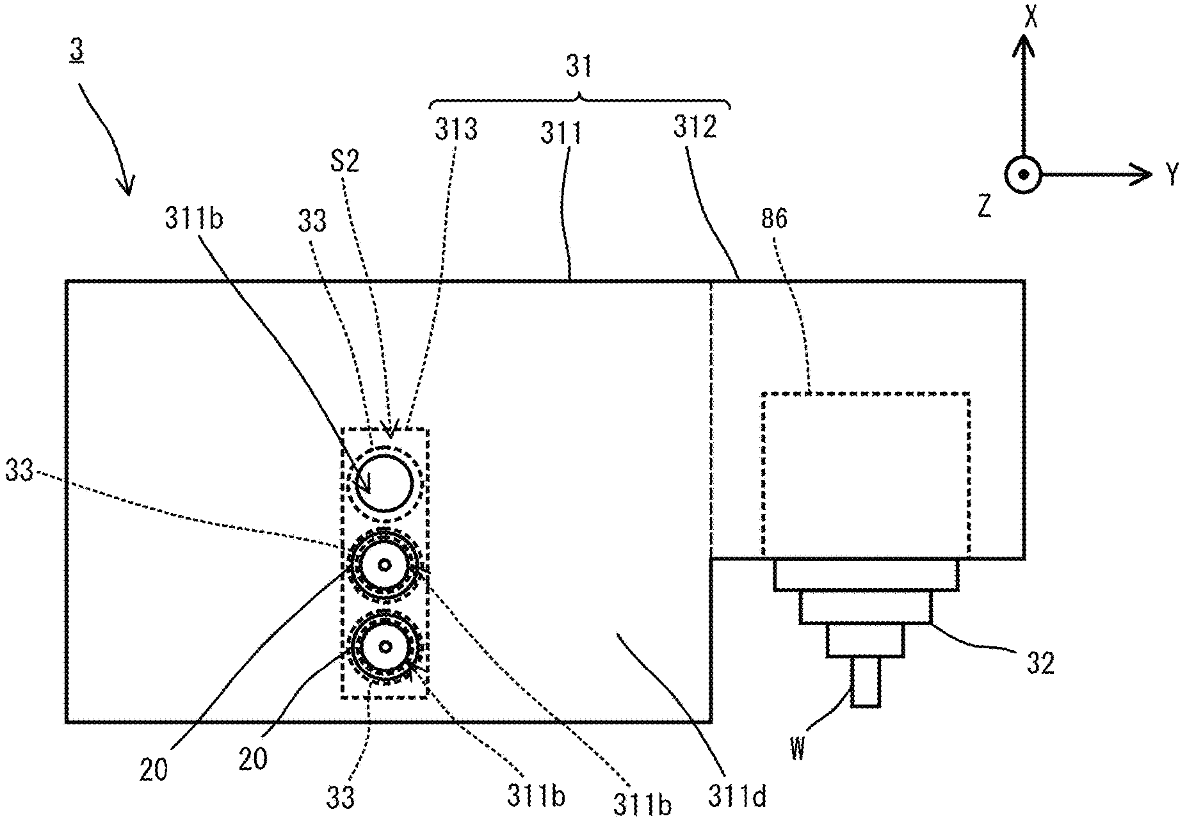
FIG. 3B is a rear view of the holding unit according to the embodiment.

As illustrated in FIG. 3A and FIG. 3B, the cover 31 includes a first section 312 having a rectangular box shape, and a second section 311 that has a hollow parallelepiped shape and is continued from the first section 312 at one end portion in the longitudinal direction, that is, the end portion on the −X direction side. As illustrated in FIG. 2, the second section 311 is supported detachably by the support member 34 at the end portion on the −Y direction side. Then, when the hollow shaft 82 of the rotation driving motor 81 and the support member 34 fixed to the hollow shaft 82 rotate about the B-axis, the cover 31 accordingly rotates about the B-axis. A first opening 311*a* in which the contact plug 361 and the elastic support 362 are detachably held is formed in a side wall 311*c* along a longitudinal direction of the second section 311, that is, the Y-axis direction in the second section 311. Further, a second opening 311*b* through which the tool 20 is inserted is formed in a side wall 311*d* different from the side wall 311*c* along the Y-axis direction in the second section 311. In other words, the second opening 311*b* is formed in a position separated from the first opening 311*a* in a surrounding wall of the cover 31. Herein, the side walls 311*c* and 311*d* are each disposed to face each other in a short-side direction of the second section 311. Further, the cover 31 includes a partition wall 313 that separates, from another region inside the cover 31, a preset tool holding region S2 for holding the tool 20 around the second opening 311*b* inside the cover 31.

Figure 4:
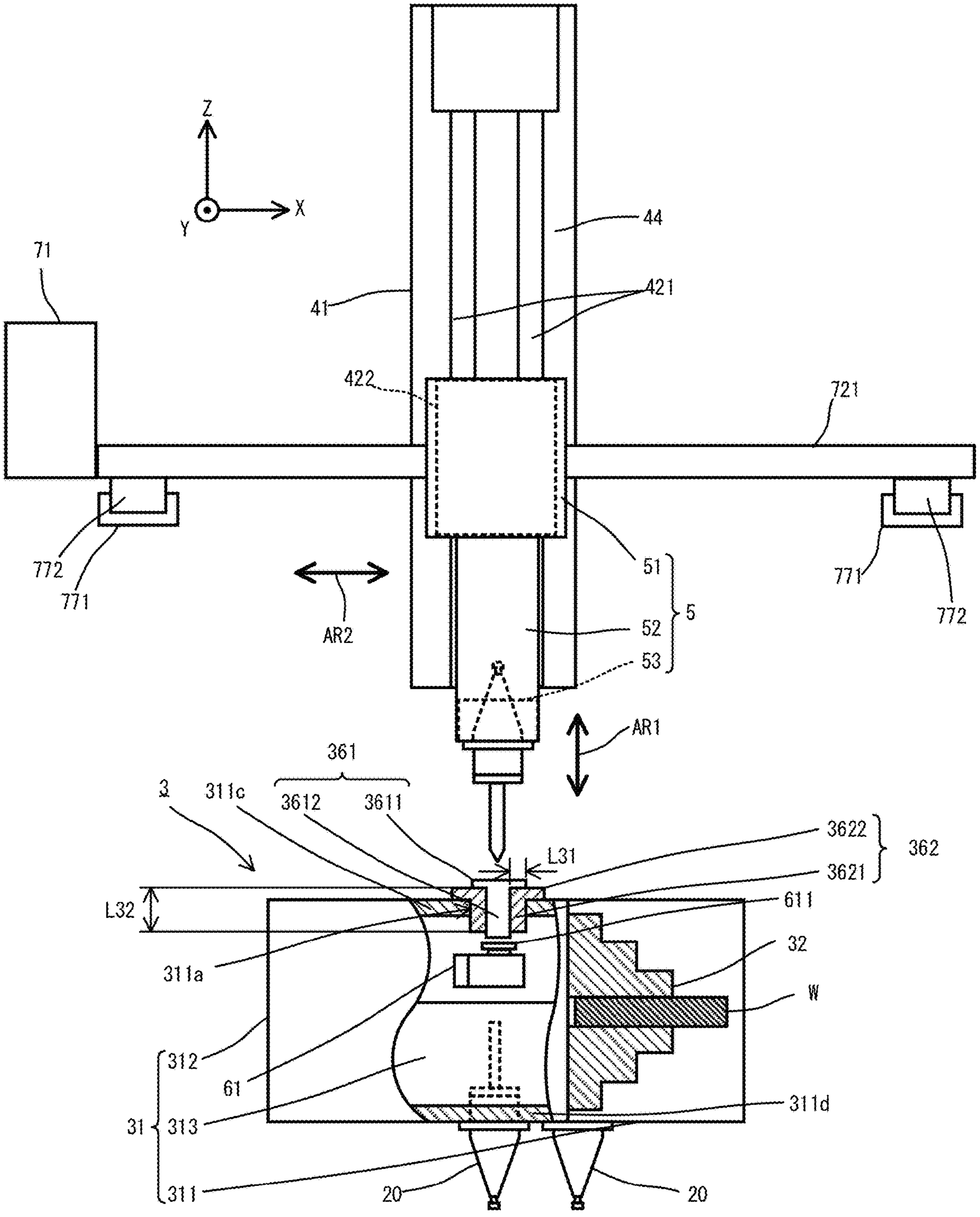
FIG. 4 is a cutaway front view of a part of the cutting machining device according to the embodiment taken along an A-A line in FIG. 3A.

For example, as illustrated in FIG. 4, the workpiece holding portion 32 is a chuck that sandwiches a base end portion of the long workpiece W. The workpiece holding portion 32 is fixed to the surrounding wall of the first section 312 of the cover 31. A fixed section in the first section 312 to which the workpiece holding portion 32 is fixed is provided in a position separated from the first opening 311*a* and the second opening 311*b* formed in the second section 311 of the cover 31. As illustrated in FIG. 2, the tool holding unit 33 is disposed in the tool holding region S2 surrounded by the partition wall 313, and holds the tool 20 inserted through the second opening 311*b* in the tool holding region S2. The tool holding unit 33 may include, for example, a magnet (not illustrated), and adsorb and hold the tool 20 by using suction force of the magnet.

The touch sensor 61 detects contact of the tip portion of the tool 20 with the contact plug 361. The touch sensor 61 is provided with a detector 611 that detects contact of an object. The touch sensor 61 is disposed in a position that faces the first opening 311*a* inside the cover 31 and in which the contact plug 361 comes into contact with the detector 611 in a state where the tip portion of the tool 20 is in contact with the contact plug 361. The touch sensor 61 is supported by the support member 34 via a sensor support portion 35, and is connected to, via the signal line L6, an input port (not illustrated) for the touch sensor 61 being provided in the controller 100. The touch sensor 61 outputs a detection signal generated when an object comes into contact with the detector 611 to the above-described input port provided in the controller 100. The controller 100 is disposed in a region outside the machining region S1 being separated from the machining region S1 inside the housing 10 via the partition wall 10*a*. Then, the signal line L6 is wired from the touch sensor 61 to the controller 100 through the inside of the hollow shaft 82. In this way, the touch sensor 61 and the signal line L6 can be prevented from being exposed to the machining region S1 in the housing 10. Thus, for example, when the machining region S1 is maintained to be a clean environment, sterilization treatment for the touch sensor 61 and the signal line L6 is unnecessary.

As illustrated in FIG. 3 and FIG. 4, the contact plug 361 is supported by the elastic support 362 fit in the first opening 311*a*, and includes a plug main body 3612 having a long columnar shape and a contact portion 3611 that is provided on one end portion in a longitudinal direction of the plug main body 3612, comes into contact with the tip portion of the tool 20, and has a disk shape. The elastic support 362 includes a support main body 3621 that has a cylindrical shape and is fit in the first opening 311*a*, and an outer flange portion 3622 engaged with an outer circumferential portion of the first opening 314*a*. The outer flange portion 3622 protrudes from one end portion on the contact portion 3611 side in a cylindrical shaft direction of the support main body 3621 in a direction orthogonal to the cylindrical shaft direction and away from the cylindrical shaft. The elastic support 362 is formed of an elastic material such as rubber and an elastomer. Herein, a length L32 in a central axis direction of the plug main body 3612 of a side surface of the plug main body 3612 in contact with the elastic support 362 is longer than a length L31 in a direction orthogonal to the central axis of the plug main body 3612 of a portion of the contact portion 3611 in contact with the elastic support 362. Further, the length L32 is preferably equal to or more than twice the length L31. In this way, variations in an inclination of the contact plug 361 due to variations in a deformation amount of the elastic support 362 can be reduced. Therefore, an influence on detection accuracy of the touch sensor 61 due to variations in an inclination of the contact plug 361 can be suppressed, and thus a relative distance from an initial position of the head 5 in a state where the tip portion of the tool 20 is in contact with the contact plug 361 can be accurately calculated.

Figure 5:
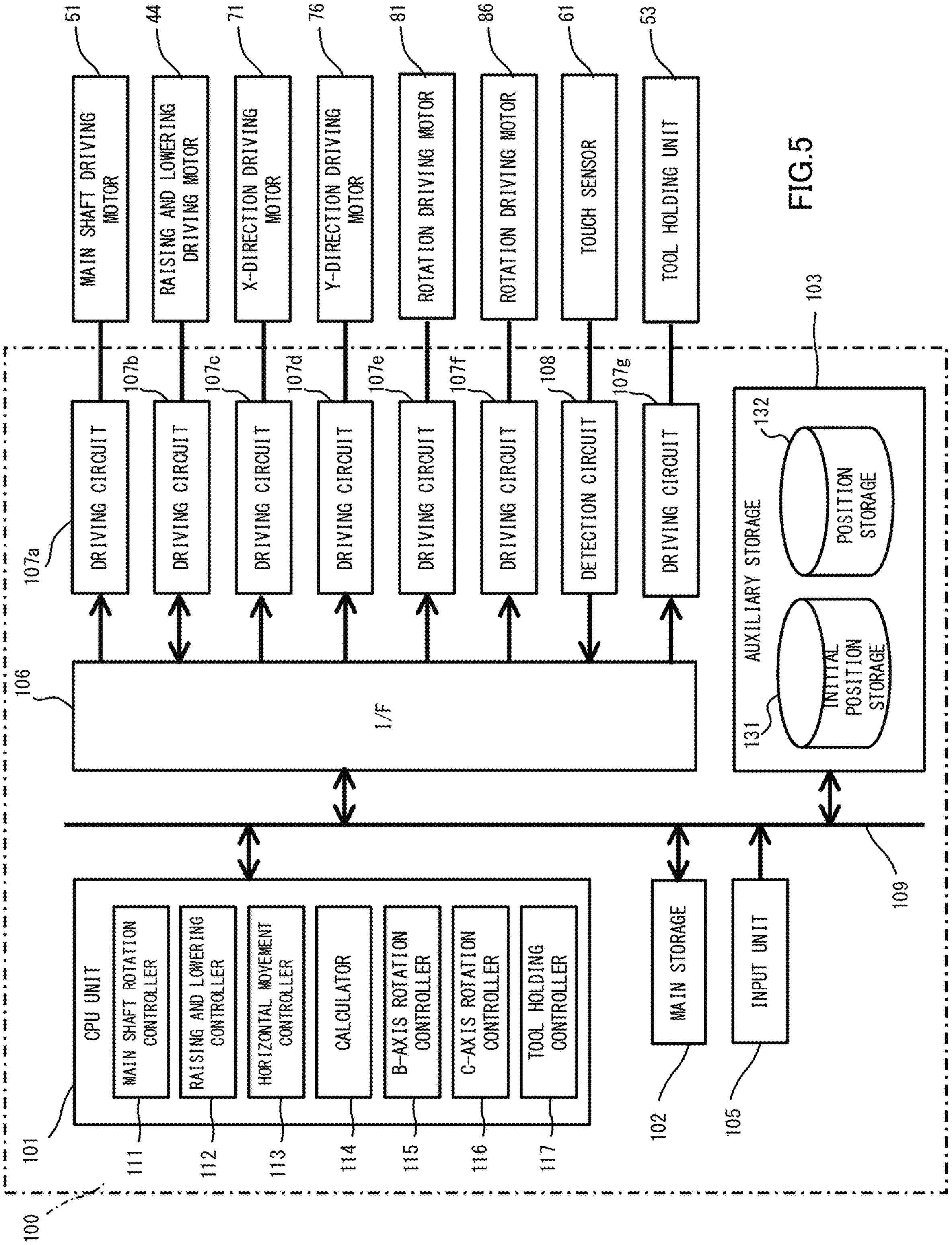
FIG. 5 is a block diagram illustrating a configuration of a controller according to the embodiment.

The controller 100 includes, for example, a programmable logic controller (PLC) including a central processing unit (CPU) unit and an input/output control unit, and an input device connected to the PLC, such as a keyboard and a touch panel. As illustrated in FIG. 5, the controller 100 includes a CPU unit 101, a main storage 102, an auxiliary storage 103, an input/output unit 105, an interface 106, and a bus 109 that connects the units. Further, the controller 100 includes driving circuits 107*a*, 107*b*, 107*c*, 107*d*, 107*e*, 107*f*, and 107*g*, and a detection circuit 108. The main storage 102 is a volatile memory such as a random access memory (RAM), for example, and is used as a work area of the CPU unit 101. The auxiliary storage 103 is a non-volatile memory such as a semiconductor memory, and stores a program for achieving various functions of the controller 100 including a machining program. The input unit 105 includes the above-described input device and an interface for connecting the input device to the bus 109. When the input unit 105 receives various pieces of operation information being input by operating the input device by a user, the input unit 105 outputs the various pieces of received operation information to the CPU unit 101. The interface 106 is connected to the driving circuits 107*a*, 1076, 107*c*, 107*d*, 107*e*, 107*f*, and 107*g*, converts control information input from the CPU unit 101 to a control signal, and outputs the control signal to the driving circuits 107*a*, 1076, 107*c*, 107*d*, 107*e*, 107*f*, and 107*g*. Further, the interface 106 is connected to the detection circuit 108, converts a detection signal input from the detection circuit 108 to detection information, and outputs the detection information to the CPU unit 101.

The driving circuit 107*a* drives the main shaft driving motor 51, based on a control signal input via the interface 106. The driving circuit 107*b* drives the raising and lowering driving motor 44, based on a control signal input via the interface 106. Further, the driving circuit 107*b* outputs, to the interface 106, a detection signal indicating a rotation amount of the raising and lowering driving motor 44 input from the position detection sensor of the raising and lowering driving motor 44. The driving circuit 107*c* drives the X-direction driving motor 71, based on a control signal input via the interface 106, and the driving circuit 107*d* drives the Y-direction driving motor 76, based on a control signal input via the interface 106. The driving circuit 107*e* drives the rotation driving motor 81, based on a control signal input via the interface 106, and the driving circuit 107*f* drives the rotation driving motor 86, based on a control signal input via the interface 106. The driving circuit 107*g* drives the tool holding unit 53, based on a control signal input via the interface 106. The detection circuit 108 outputs, to the interface 106, a detection signal input from the touch sensor 61.

The CPU unit 101 functions as a main shaft rotation controller 111, a raising and lowering controller 112, a horizontal movement controller 113, a calculator 114, a B-axis rotation controller 115, a C-axis rotation controller 116, and a tool holding controller 117 by reading the above-described program stored in the auxiliary storage 103 into the main storage 102 and executing the program. Further, the auxiliary storage 103 includes an initial position storage 131 and a position storage 132. The initial position storage 131 stores initial position information indicating a preset initial position of the head 5.

Figure 6B:
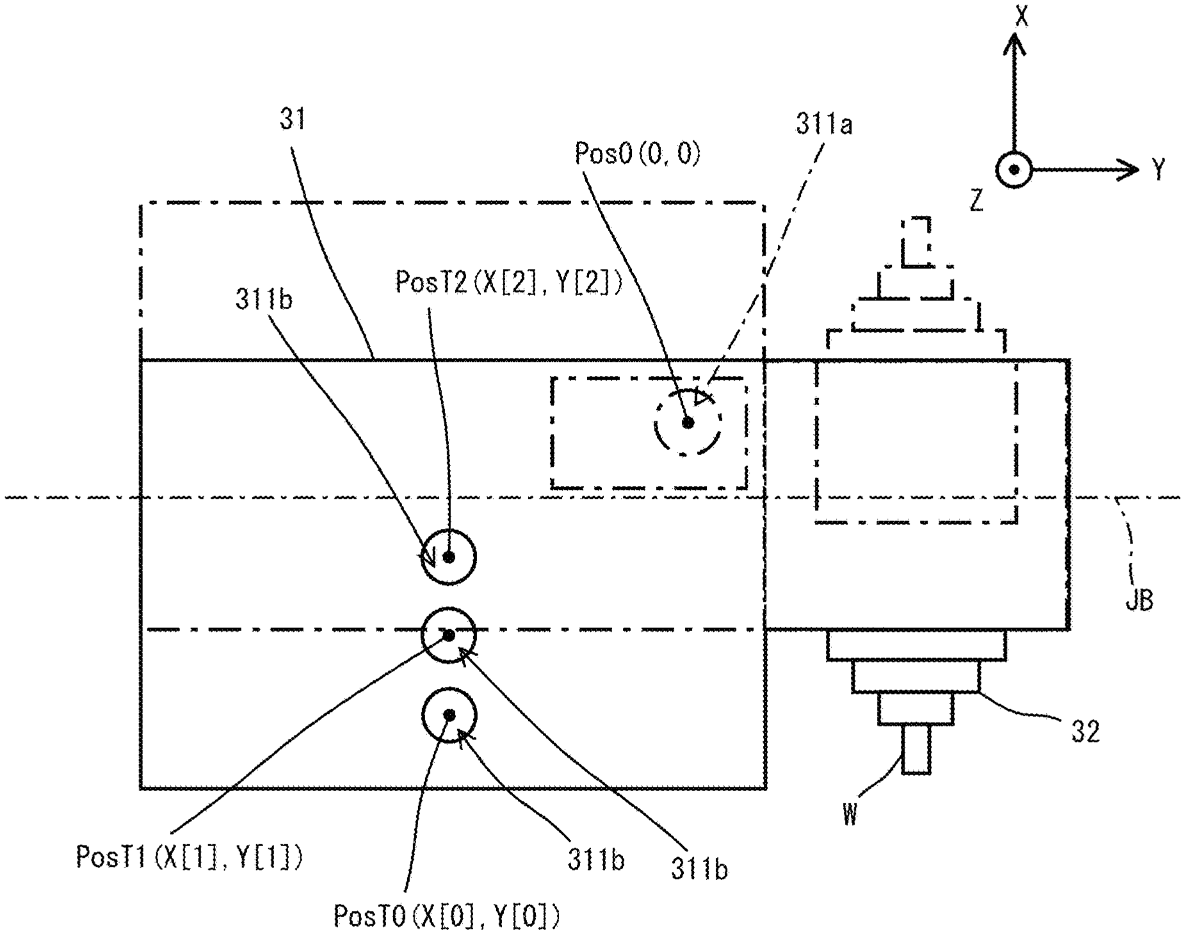
FIG. 6B is a diagram illustrating a relationship between a tool holding position and an initial position according to the embodiment.

For example, as illustrated in FIG. 6A, the position storage 132 stores relative distance information for each tool 20 held by the holding unit 3 in association with tool identification information that identifies the tool 20. Herein, the relative distance information indicates a relative distance in the Z-axis direction from an initial position of the head 5 to a position of the head 5 when the tip portion of the tool 20 comes into contact with the contact plug 361 by lowering the head 5 with the cover 31 of the holding unit 3 in a posture in which the contact plug 361 is disposed vertically upward. Further, the position storage 132 stores tool holding position information indicating position coordinates in an XY direction of the tool 20 held by the holding unit 3 in association with the tool identification information about the tool 20. Herein, for example, as illustrated in FIG. 6B, the tool holding position information indicates coordinates of tool holding positions PosT1, PosT2, and PosT3 in the XY direction of each second opening 311*b* through which the tool 20 is inserted with the cover 31 of the holding unit 3 in a posture in which the second opening 311*b* side is disposed vertically upward. Further, coordinates indicated by the tool holding position information may be expressed as coordinates when an initial position Pos0 is the origin. Further, as illustrated in FIG. 6A, for each tool 20, the position storage 132 stores, in association with the tool identification information, machining start position information indicating a machining start position when cutting machining is performed with the C-axis being horizontal and a machining start position when cutting machining is performed with the C-axis being perpendicular. Herein, the machining start position is expressed as a relative distance from an initial position of the head 5 in the Z-axis direction.

The main shaft rotation controller 111 generates control information and outputs the control information to the interface 106 in such a way as to maintain a state where the main rotating shaft 52 is rotated or the main rotating shaft 52 is not rotated according to a machining direction of the workpiece W. At this time, the driving circuit 107*a* operates and stops the main shaft driving motor 51, based on a control signal input from the interface 106.

When machining of the workpiece W starts, the raising and lowering controller 112 specifies the tool identification information about the tool 20 received from the holding unit 3, based on the tool holding position information stored in the position storage 132. Then, the raising and lowering controller 112 specifies machining start position information associated with the specified tool identification information from among pieces of the machining start position information stored in the position storage 132, generates, based on the specified machining start position information, control information for moving the head 5 from an initial position to a machining start position when cutting machining is performed on the workpiece W by using the tool 20, and outputs the control information to the interface 106. Subsequently, the raising and lowering controller 112 generates control information for raising and lowering the head 5, based on a machining program according to a shape of the workpiece W, and outputs the control information to the interface 106. At this time, the driving circuit 107*b* operates the raising and lowering driving motor 44, based on a control signal input from the interface 106. Further, the raising and lowering controller 112 calculates a contact position of the tip portion of the tool 20 with the workpiece W, a cutting amount of the workpiece W, and the like, based on detection information input from the driving circuit 107*b* via the interface 106, and generates control information, based on the calculated contact position, cutting amount, and the like.

The horizontal movement controller 113 generates control information for moving the head 5 in the X-axis direction and the Y-axis direction, and outputs the control information to the interface 106. At this time, the driving circuits 107*c* and 107*d* respectively operate and stop the X-direction driving motor 71 and the Y-direction driving motor 76, based on a control signal input from the interface 106.

The calculator 114 first specifies the tool identification information about the tool 20 received from the holding unit 3, based on the tool holding position information stored in the position storage 132. Next, the calculator 114 detects that the tip portion of the tool 20 installed on the main rotating shaft 52 comes into contact with the contact plug 361, based on the detection information input from the detection circuit 108 via the interface 106. Herein, the calculator 114 calculates a relative distance from an initial position of the head 5 to a contact position of the head 5 when the tip portion of the tool 20 comes into contact with the contact plug 361, based on information about a rotation amount indicated by the detection information input from the driving circuit 107*b* via the interface 106. Specifically, the calculator 114 calculates a relative distance associated with the tool 20, based on a product of a movement amount and a rotation amount in the Z-axis direction per one rotation of the raising and lowering driving motor 44. Then, the calculator 114 calculates, based on the calculated relative distance, a machining start position when cutting machining is performed on the workpiece W by using the tool 20. In other words, the calculator 114 calculates a machining start position when cutting machining is performed on the workpiece W by the tool 20, based on an initial position of the head 5 and a contact position of the head 5, which is detected by using the touch sensor 61, when the tip portion of the tool 20 comes into contact with the contact plug 361. Then, the calculator 114 stores, in association with the specified tool identification information, machining start position information indicating the calculated machining start position in the position storage 132.

The B-axis rotation controller 115 generates control information for rotating the entire cover 31 about the B-axis, and outputs the control information to the interface 106. At this time, the driving circuit 107*e* operates and stops the rotation shaft driving motor 81, based on a control signal input from the interface 106. Further, the C-axis rotation controller 116 generates control information for rotating the workpiece holding portion 32 about the C-axis, and outputs the control information to the interface 106. At this time, the driving circuit 107*f* operates and stops the rotation shaft driving motor 86, based on a control signal input from the interface 106. The tool holding controller 117 generates control information for causing the tool holding unit 53 to hold the tool 20 and releasing holding, and outputs the control information to the interface 106. At this time, the driving circuit 107*g* brings the tool holding unit 53 into a state of holding the tool 20 and releases the holding state of the tool 20, based on a control signal input from the interface 106.

Next, a method of using the cutting machining device 1 according to the present embodiment is described. Herein, a case where the cutting machining device 1 performs cutting machining on the workpiece W by using a plurality of the tools 20 is described. First, a user of the cutting machining device 1 causes the tool holding unit 33 of the cover 31 to hold the tool 20 by inserting the plurality of tools 20 used in cutting machining into the second opening 311*b* of the cover 31 by the user. Further, the user installs the elastic support 362 that supports the contact plug 361 into the first opening 311*a* of the cover 31. Herein, the cover 31 is in a posture in which the B-axis thereof is parallel to the vertical direction in an initial state. Then, the user causes the cover 31 to hold the tool 20 from the side orthogonal to the vertical direction, and installs the contact plug 361. Next, the workpiece holding portion 32 is caused to hold the workpiece W. Subsequently, the user installs the cover 31 on the support member 34 of the cutting machining device 1, and then closes a door attached to the opening 10*b* of the housing 10. In this way, the machining region S1 in the housing 10 is brought into an enclosed state. Subsequently, the user performs an operation for rotating the entire cover 31 about the B-axis in such a way that the first opening 311*a* of the cover 31 is located on a vertically upward side via the input unit 105. Then, the cutting machining device 1 rotates, by the rotation driving motor 81, the entire cover 31 about the B-axis in such a way that the second opening 311*b* of the cover 31 is located on the vertically upward side. In this way, preparation for performing cutting machining on the workpiece W is completed. Next, when the user performs an operation for starting cutting machining of the workpiece W via the input unit 105, the cutting machining device 1 measures a relative distance for each of the plurality of tools 20 used in cutting machining, and then performs cutting machining on the workpiece W by using the plurality of tools 20. Herein, each time cutting machining of one workpiece W is completed, the user can remove the cover 31 from the support member 34 and perform sterilization treatment on the cover 31, and can replace the contact plug 361 and the elastic support 362 with those subjected to sterilization treatment.

Next, in cutting machining of the workpiece W, cutting machining processing performed by the controller 100 according to the present embodiment is described with reference to FIG. 7 to FIG. 11. The cutting machining processing starts when the power of the cutting machining device 1 is turned on and then a user performs an operation for starting the cutting machining processing via the input unit 105 as described above.

Figure 7:
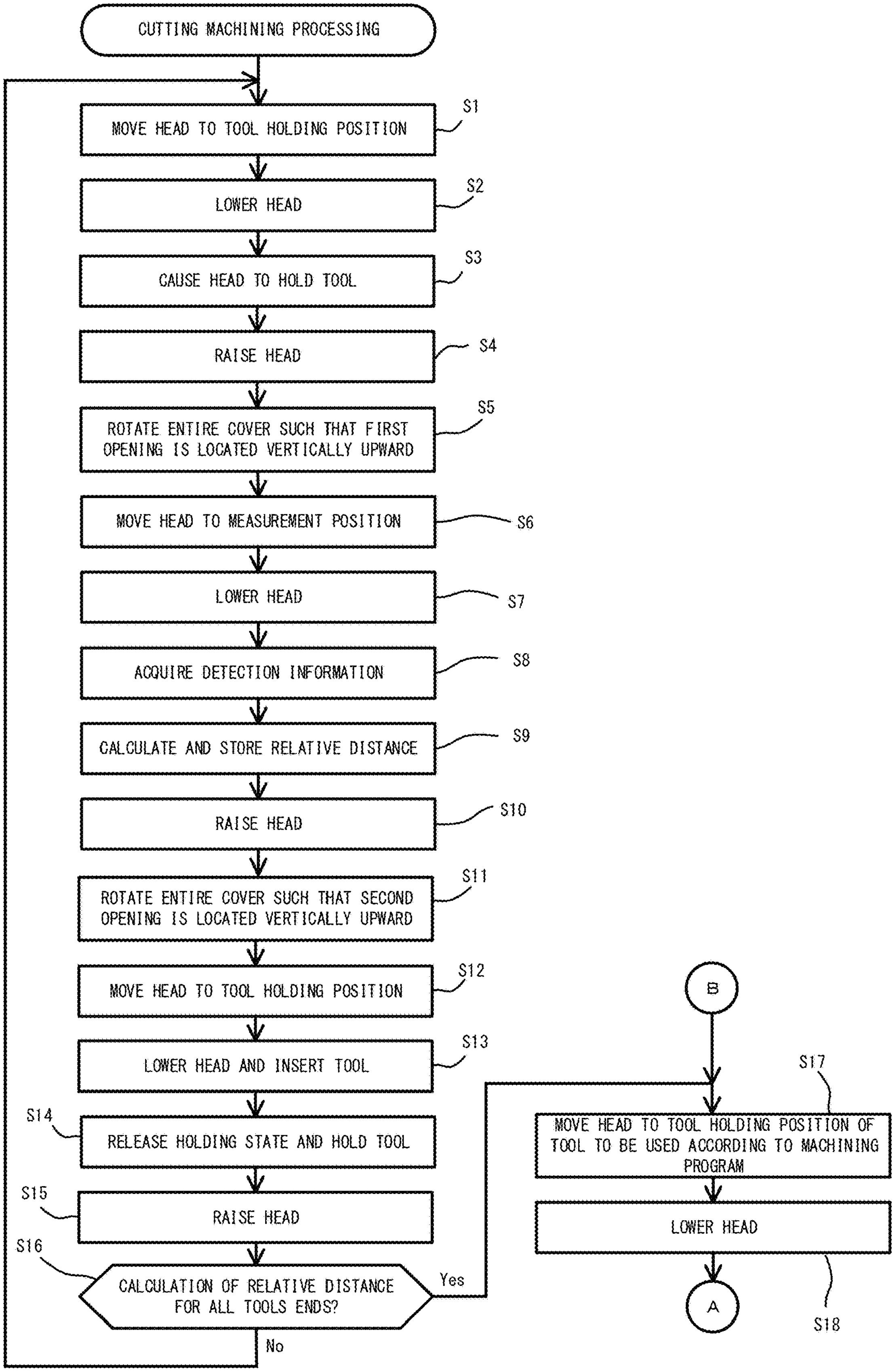
FIG. 7 is a flowchart illustrating one example of a flow of cutting machining processing performed by the controller according to the embodiment.

First, as illustrated in FIG. 7, the horizontal movement controller 113 drives the X-direction driving motor 71 and the Y-direction driving motor 76, and moves the head 5 to a specified tool holding position, that is, vertically above the tool 20 whose relative distance has not been calculated yet (step S1). Next, the raising and lowering controller 112 drives the raising and lowering motor 44, and lowers the head 5 (step S2). Subsequently, when the head 5 is lowered to a preset position for causing the tool holding unit 53 of the main rotating shaft 52 to hold the tool 20, the tool holding controller 117 causes the tool holding unit 53 to hold the tool 20, that is, causes the head 5 to hold the tool 20 (step S3). Subsequently, the raising and lowering controller 112 drives the raising and lowering motor 44, and raises the head 5 to the same height as an initial position (step S4). Next, the B-axis rotation controller 115 drives the rotation driving motor 81, and rotates the entire cover 31 in such a way that the first opening 311*a* side on which the contact plug 361 in the cover 31 is installed is disposed vertically upward (step S5).

Figure 8A:
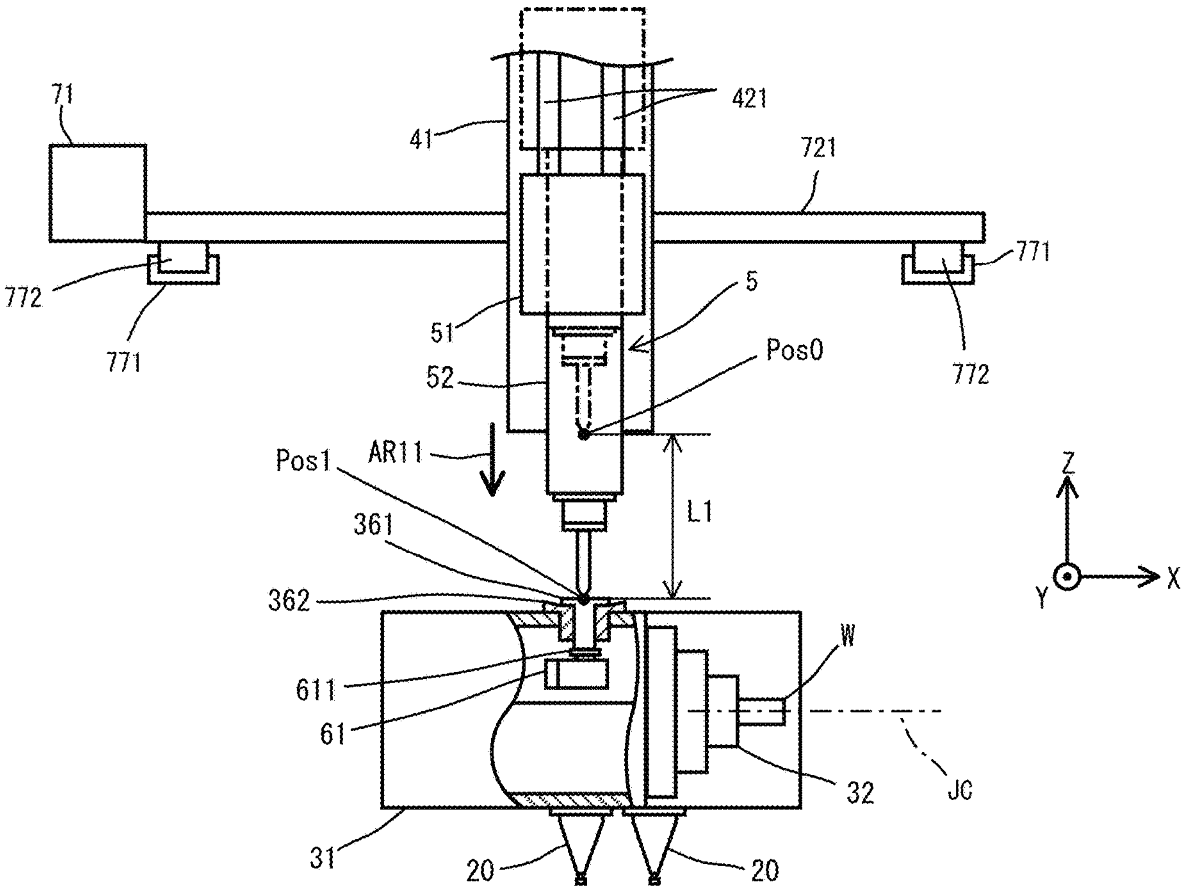
FIG. 8A is a cutaway front view of a part of the cutting machining device according to the embodiment illustrating a state where a tip portion of a tool is in contact with a contact plug.
Figure 8B:
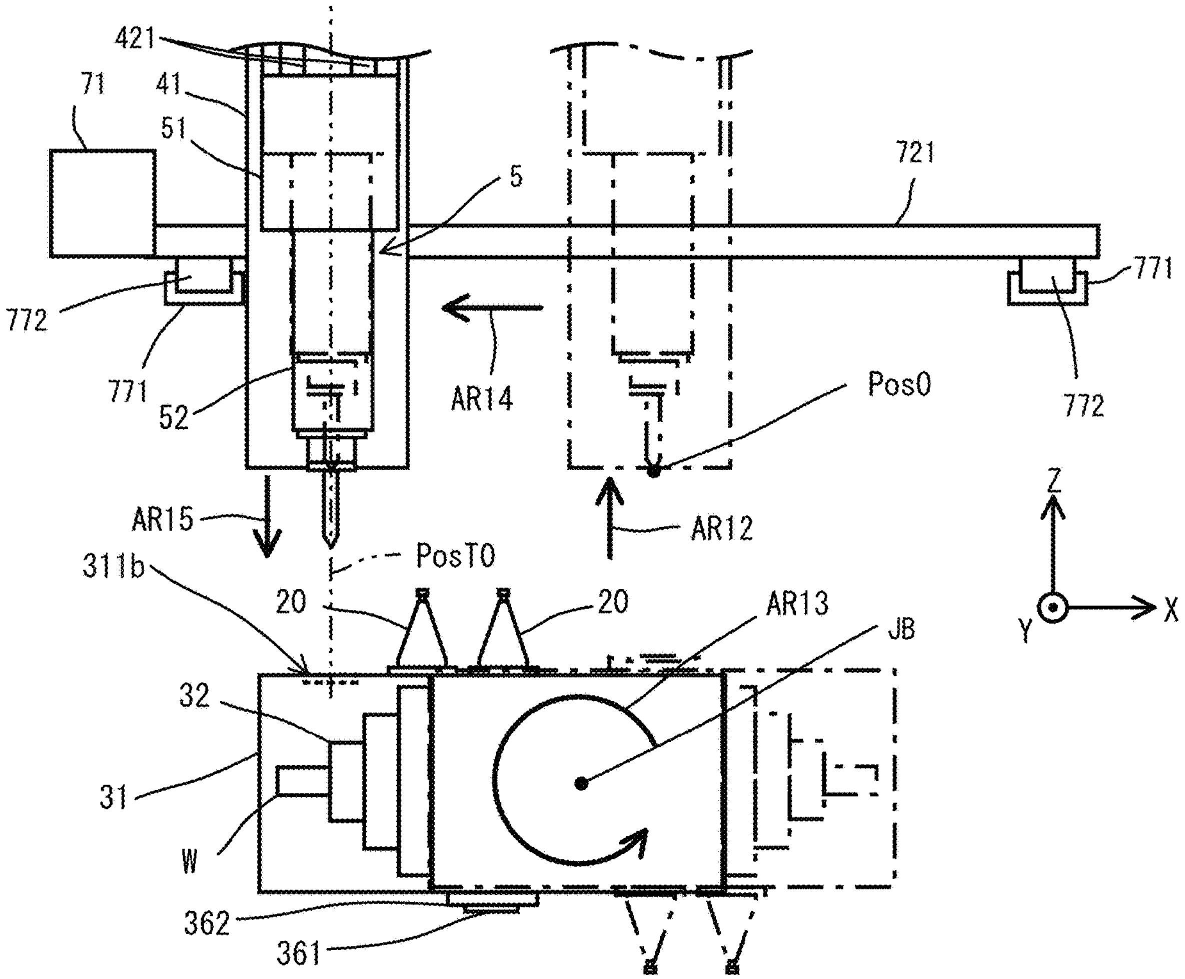
FIG. 8B is a front view of the cutting machining device according to the embodiment illustrating a scene where a head moves to a tool insertion position and then descends.
Figure 9A:
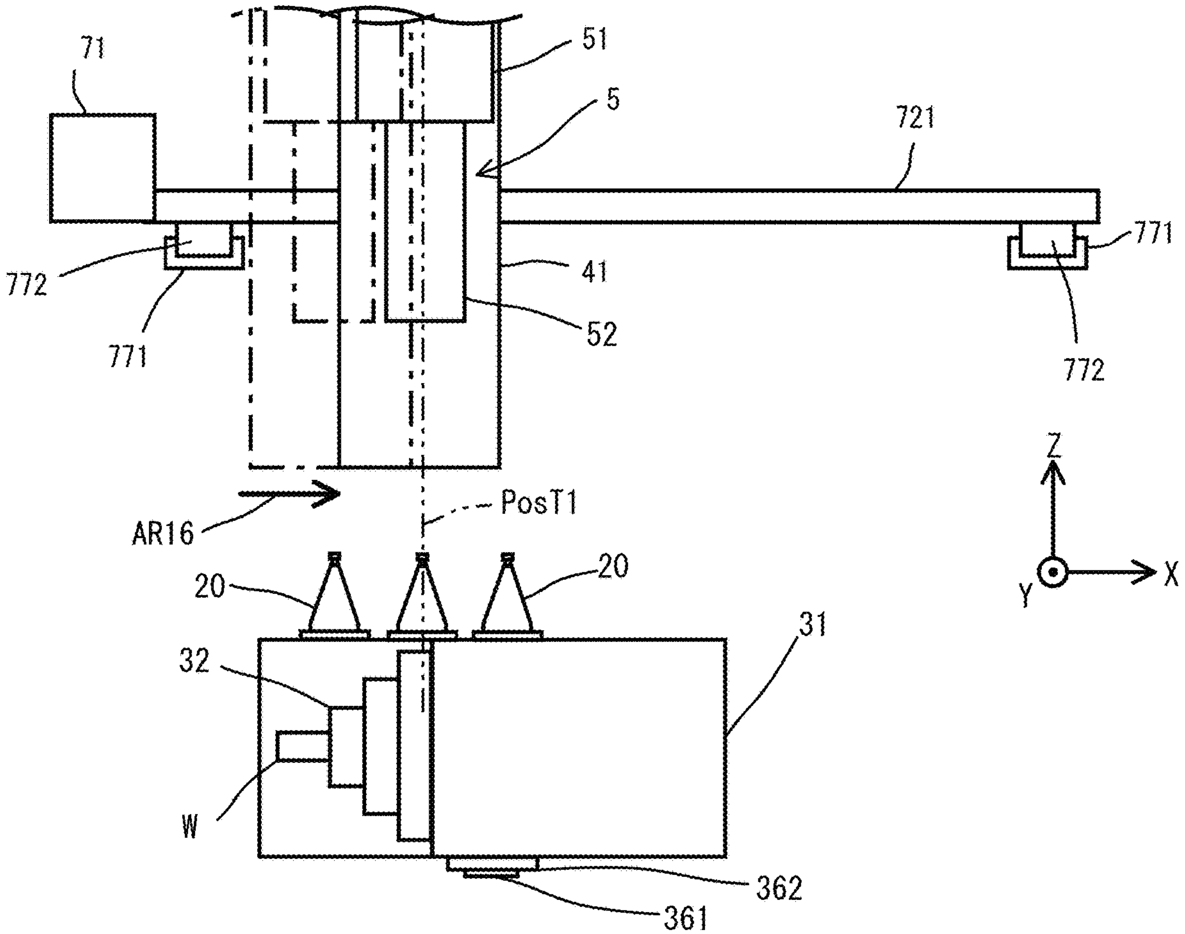
FIG. 9A is a front view of the cutting machining device according to the embodiment illustrating a scene where the head moves to a tool holding position.
Figure 9B:
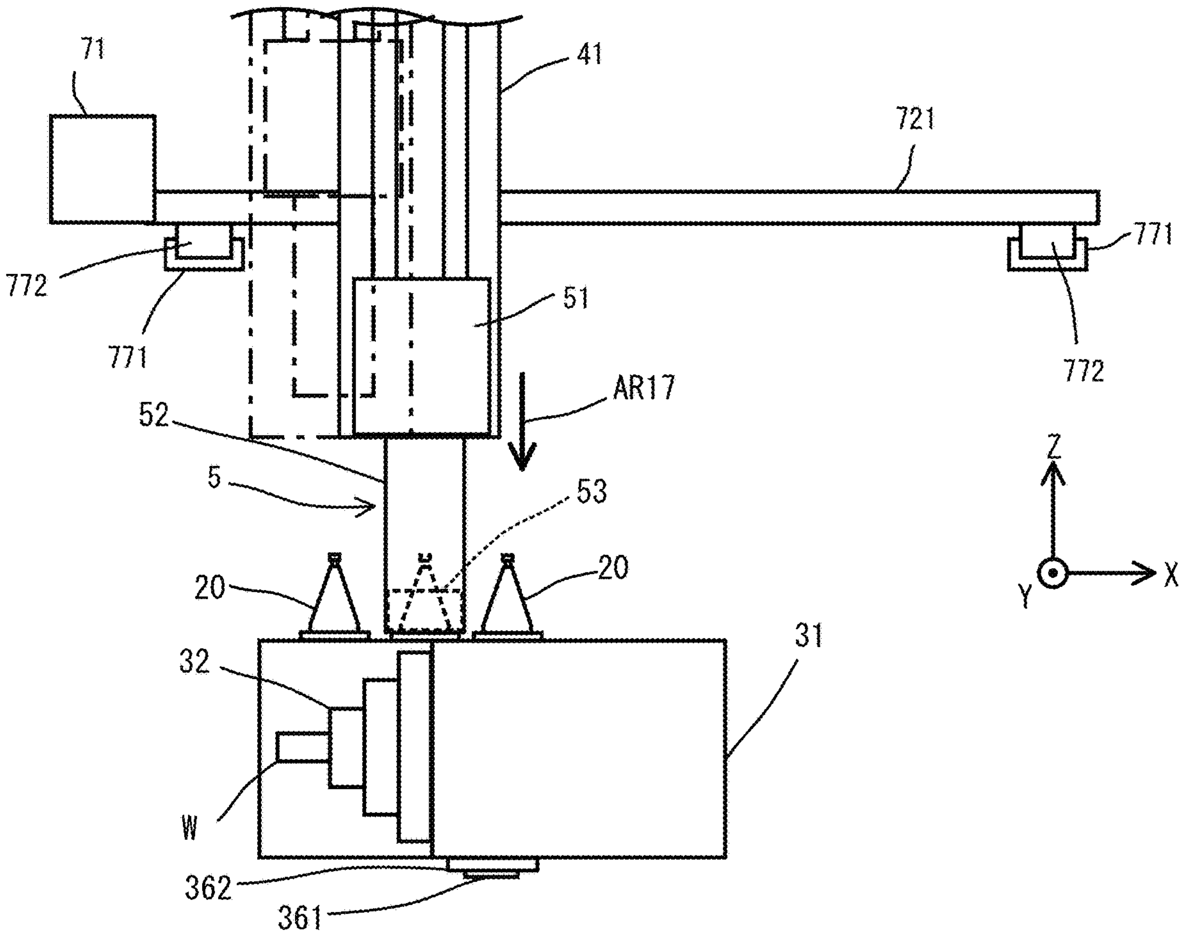
FIG. 9B is a front view of the cutting machining device according to the embodiment illustrating a state where the head is in contact with the tool.

Subsequently, the horizontal movement controller 113 drives the X-direction driving motor 71 and the Y-direction driving motor 76, and moves the head 5 to a measurement position for measuring a relative distance with respect to the tool 20, that is, a position in which the tool 20 is disposed vertically above the contact plug 361 (step S6). Subsequently, the raising and lowering controller 112 drives the raising and lowering motor 44, and lowers the head 5 (step S7). At this time, for example, as indicated by an arrow AR11 in FIG. 8A, the head 5 moves in a direction closer to the contact plug 361. Returning to FIG. 7, next, it is assumed that the calculator 114 detects that the tip portion of the tool 20 installed on the main rotating shaft 52 comes into contact with the contact plug 361, based on detection information input from the touch sensor 61 via the detection circuit 108 (step S8). At this time, the calculator 114 calculates a relative distance from the initial position of the head 5 to a contact position of the head 5 when the tip portion of the tool 20 comes into contact with the contact plug 361, based on information about a rotation amount indicated by the detection information input from the driving circuit 107*b* via the interface 106, and stores relative distance information indicating the calculated relative distance in the position storage 132 (step S9). For example, as illustrated in FIG. 8A, the calculator 114 calculates a relative distance from a contact position Pos1 in which the tip portion of the tool 20 comes into contact with the contact plug 361 to the initial position Pos0. Returning to FIG. 7, subsequently, the raising and lowering controller 112 drives the raising and lowering motor 44, and raises the head 5 to the initial position (step S10).

Subsequently, the B-axis rotation controller 115 drives the rotation driving motor 81, and rotates the entire cover 31 in such a way that the second opening 311*b* side is disposed vertically upward (step S11). For example, as indicated by an arrow AR12 in FIG. 8B, after the head 5 is raised to the initial position, the cover 31 rotates about the B-axis JB as indicated by an arrow AR13, and the second opening 311*b* side of the cover 31 is disposed vertically upward. Returning to FIG. 7, next, the horizontal movement controller 113 refers to the tool holding position information stored in the position storage 132, and specifies a tool holding position in which the tool 20 whose relative distance has been already calculated is held. Then, the horizontal movement controller 113 drives the X-direction driving motor 71 and the Y-direction driving motor 76, and moves the head 5 to the specified tool holding position, that is, vertically above the second opening 311*b* through which the tool 20 whose relative distance has been calculated is inserted (step S12). Next, the raising and lowering controller 112 drives the raising and lowering motor 44 and lowers the head 5, and thus inserts the tool 20 into the second opening 311*b* (step S13). For example, as indicated by an arrow AR14 in FIG. 8B, the head 5 moves to a tool holding position PosT0, that is, vertically above the second opening 311*b* in the cover 31 through which the tool 20 is not inserted, and then moves in a direction closer to the second opening 311*b* as indicated by an arrow AR15, and the tool 20 is inserted into the second opening 311*b* of the cover 31.

Returning to FIG. 7, subsequently, the tool holding controller 117 drives the tool holding unit 53 and releases a holding state of the tool 20, and thus the tool 20 is held by the tool holding unit 33 of the holding unit 3 (step S14). Subsequently, the raising and lowering controller 112 drives the raising and lowering motor 44, and raises the head 5 (step S15).

Next, the B-axis rotation controller 115 determines whether calculation of a relative distance for all of the tools 20 to be used is completed (step S16). Herein, when the B-axis rotation controller 115 determines that there is the tool 20 whose relative distance has not been calculated yet among the tools 20 to be used (step S16: No), the processing in step S1 is performed again. In this case, for example, as indicated by an arrow AR16 in FIG. 9A, the head 5 moves to the tool holding position PosT1, that is, vertically above the tool 20 whose relative distance has not been calculated yet in the cover 31, and then moves in a direction closer to the tool 20 whose relative distance has not been calculated yet as indicated by an arrow AR17 in FIG. 9B, and holds the tool 20.

Figure 10:
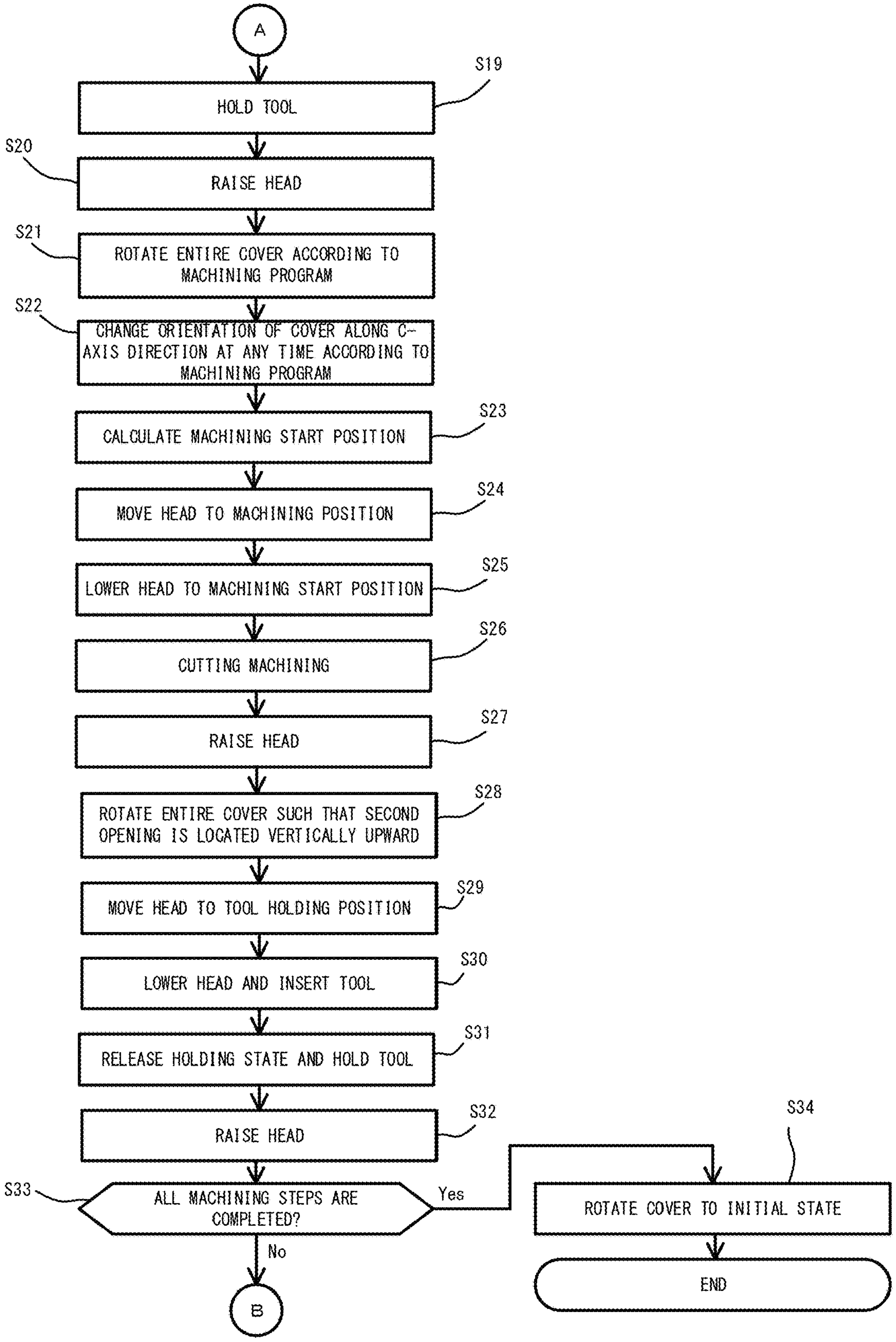
FIG. 10 is a flowchart illustrating one example of a flow of cutting machining processing performed by the controller according to the embodiment.

On the other hand, it is assumed that the B-axis rotation controller 115 determines that calculation of a relative distance for all of the tools 20 to be used is completed (step S16: Yes). In this case, the horizontal movement controller 113 refers to the tool holding position information stored in the position storage 132, and specifies a tool holding position of the tool 20 to be used. Then, the horizontal movement controller 113 drives the X-direction driving motor 71 and the Y-direction driving motor 76, and moves the head 5 to the tool holding position of the tool 20 to be used, that is, vertically above the tool 20 to be used according to a machining program (step S17). Subsequently, the raising and lowering controller 112 drives the raising and lowering motor 44, and lowers the head 5 (step S18). Subsequently, as illustrated in FIG. 10, when the head 5 is lowered to a preset position for causing the tool holding unit 53 to hold the tool 20, the tool holding controller 117 causes the tool holding unit 53 to hold the tool 20, that is, causes the head 5 to hold the tool 20 (step S19). Subsequently, the raising and lowering controller 112 drives the raising and lowering motor 44, and raises the head 5 to the same height as the initial position (step S20). Next, the B-axis rotation controller 115 drives the rotation driving motor 81 according to the machining program, and thus rotates the entire cover 31 according to the machining program (step S21).

Figure 11A:
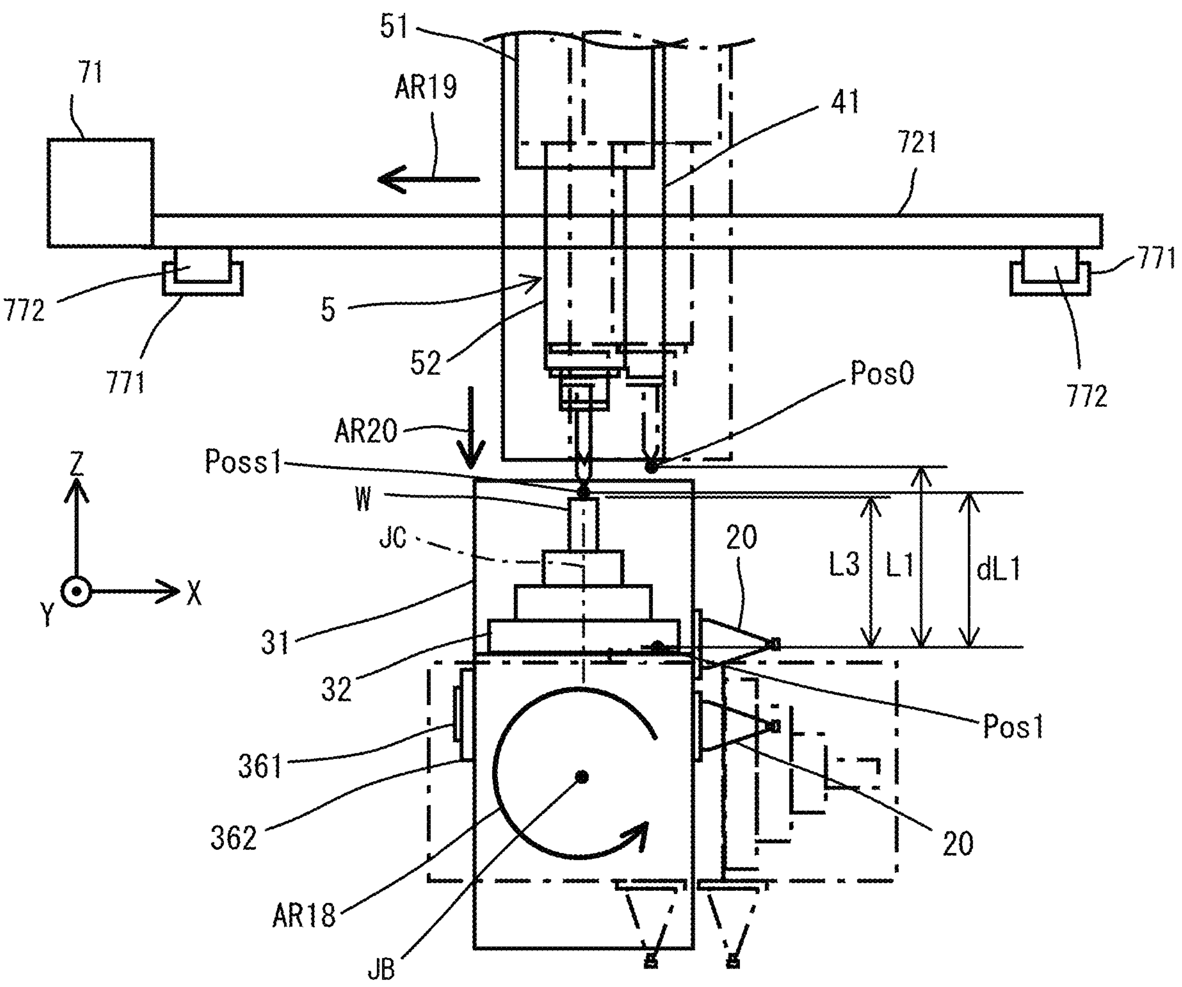
FIG. 11A is a front view of the cutting machining device according to the embodiment illustrating a scene where the head descends to a machining start position when a C-axis is parallel to a vertical direction.
Figure 11B:
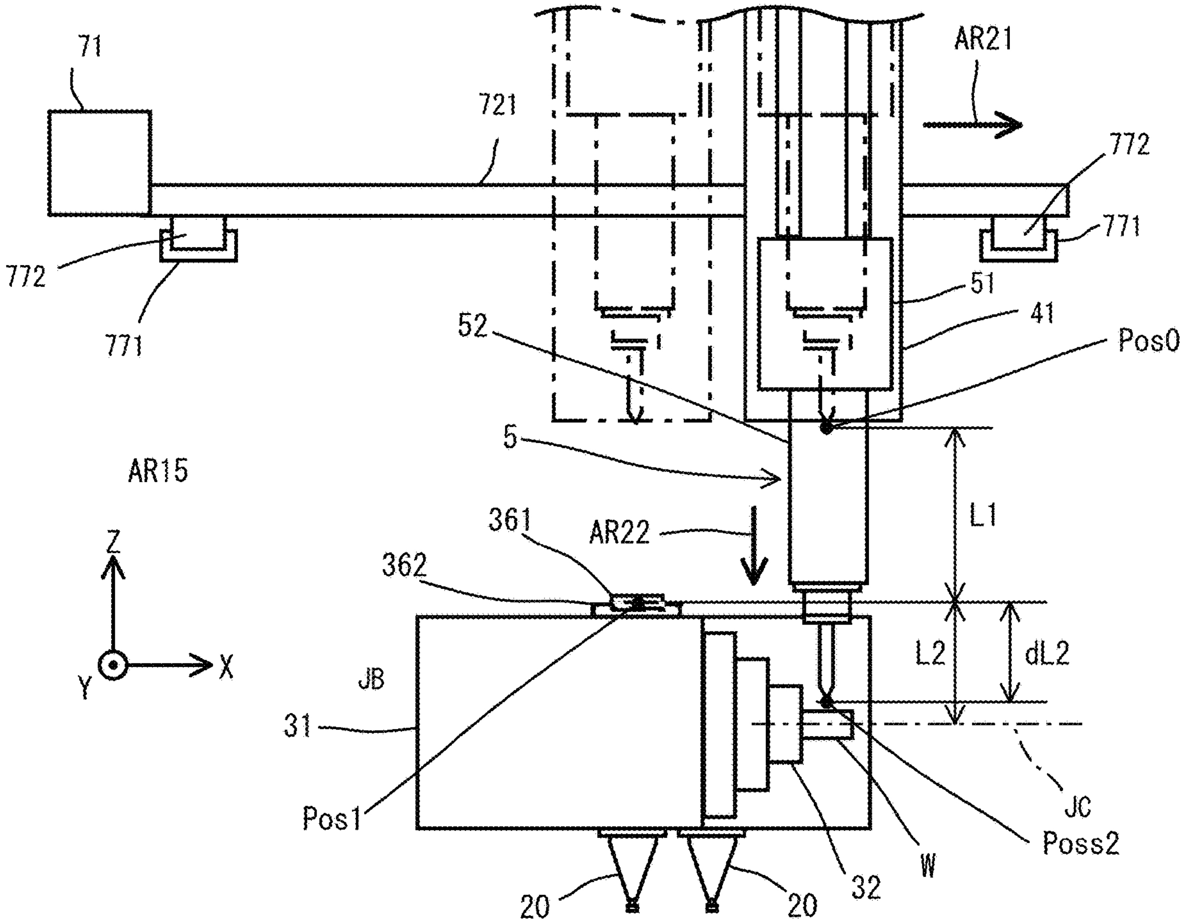
FIG. 11B is a front view of the cutting machining device according to the embodiment illustrating a scene where the head descends to the machining start position when the C-axis is orthogonal to the vertical direction.

Subsequently, the B-axis rotation controller 115 drives the rotation driving motor 81 according to the machining program, and thus changes an orientation of the entire cover 31 along the C-axis direction at any time according to the machining program (step S22). Subsequently, the calculator 114 calculates a machining start position (step S23). Herein, for example, as illustrated in FIG. 11A, when the C-axis direction of the entire cover 31 coincides with the vertical direction, the calculator 114 calculates a machining start position Poss1 located closer to the +Z-direction side by a preset distance dL1 than the contact position Pos1 with the contact plug 361 of the tool 20. Herein, the distance dL1 is set to be a distance longer than a distance L3 from the contact position Pos1 with the contact plug 361 of the tool 20 in the C-axis direction in a state where the workpiece holding portion 32 holds the workpiece W to a tip portion of the workpiece W. Alternatively, for example, as illustrated in FIG. 11B, when the C-axis direction of the entire cover 31 coincides with the horizontal direction, the calculator 114 calculates a machining start position Poss2 located closer to the −Z-direction side by a preset distance dL2 than the contact position Pos1 with the contact plug 361 of the tool 20. Herein, the distance dL2 is set to be a distance shorter than a distance L2 from the C-axis JC in the state where the workpiece holding portion 32 holds the workpiece W to the contact position Pos1 with the contact plug 361 of the tool 20. Further, the distance dL2 is set shorter than the distance L2 by a length corresponding to a maximum radius of a radius of a cut end when the workpiece W at least having a possibility of being a machining target is cut by a plane orthogonal to the C-axis JC.

Returning to FIG. 10, next, the horizontal movement controller 113 drives the X-direction driving motor 71 and the Y-direction driving motor 76, and moves the head 5 to a machining position, that is, a position in which the tool 20 is disposed vertically above the workpiece W (step S24). Subsequently, the raising and lowering controller 112 drives the raising and lowering motor 44, and lowers the head 5 to a machining start position (step S25). In the series of the processing from steps S21 to S25, for example, as indicated by an arrow AR18 in FIG. 11A, after the cover 31 rotates in such a way that the C-axis direction coincides with the vertical direction, the head 5 moves to the machining position as indicated by an arrow AR19, and then the head 5 is lowered to the machining start position Poss1 as indicated by an arrow AR20. Alternatively, for example, as indicated by an arrow AR21 in FIG. 11B, the head 5 moves to the machining position, and then the head is lowered to the machining start position Poss2 as indicated by an arrow AR22.

Returning to FIG. 10, subsequently, cutting machining is performed (step S26). Herein, for example, while the main shaft rotation controller 111 drives the main shaft driving motor 51 and rotates the main rotating shaft 52, the raising and lowering controller 112 drives the raising and lowering driving motor 44 and lowers the head 5 from the machining start position, and thus the center of the workpiece W is drilled. Alternatively, for example, while the C-axis shaft rotation controller 116 drives the rotation driving motor 86 and rotates the workpiece holding portion 32 about the C-axis JC, the raising and lowering controller 112 drives the raising and lowering driving motor 44 and lowers the head 5 from the machining start position, and thus the side of the workpiece W is cut. Next, when cutting machining ends, the raising and lowering controller 112 drives the raising and lowering motor 44, and raises the head 5 to the initial position (step S27).

Subsequently, the B-axis rotation controller 115 drives the rotation driving motor 81, and rotates the entire cover 31 in such a way that the second opening 311*b* side is disposed vertically upward (step S28). Subsequently, the horizontal movement controller 113 refers to the tool holding position information stored in the position storage 132, and specifies a tool holding position in which the tool 20 whose relative distance has been already calculated is held. Then, the horizontal movement controller 113 drives the X-direction driving motor 71 and the Y-direction driving motor 76, and moves the head 5 to the specified tool holding position, that is, vertically above the second opening 311*b* through which the tool 20 whose relative distance has been calculated is inserted (step S29). Next, the raising and lowering controller 112 drives the raising and lowering motor 44 and lowers the head 5, and thus inserts the tool 20 into the second opening 311*b* (step S30). Subsequently, the tool holding controller 117 drives the tool holding unit 53 and releases a holding state of the tool 20, and thus the tool 20 is held by the tool holding unit 33 of the holding unit 3 (step S31). Subsequently, the raising and lowering controller 112 drives the raising and lowering motor 44, and raises the head 5 (step S32). Next, the B-axis rotation controller 115 determines whether all of the machining steps end, based on the machining program for performing cutting machining on the workpiece W (step S33). Herein, when the B-axis rotation controller 115 determines that there is the machining step that has not ended yet (step S33: No), the processing in step S17 is performed again. On the other hand, when the B-axis rotation controller 115 determines that all of the machining steps end (step S33: Yes), the B-axis rotation controller 115 rotates the entire cover 31 to the initial state, that is, a posture in which a direction along the C-axis of the cover 31 coincides with the vertical direction (step S34), and then the cutting machining processing ends.

As described above, according to the cutting machining device 1 of the present embodiment, the calculator 114 of the controller 100 calculates a machining start position when cutting machining is performed on the workpiece W by the tool 20, based on an initial position of the head 5 and a contact position of the head 5, which is detected by using the touch sensor 61, when the tip portion of the tool 20 comes into contact with the contact plug 361. Further, the cover 31 has a box shape, and has the first opening 311*a* in which the contact plug 361 is detachably held in the position separated from the fixed section to which the workpiece holding portion 32 in the surrounding wall is fixed. In this way, a machining start position when cutting machining is performed on the workpiece W by the tool 20 can be accurately calculated, and thus machining accuracy can be improved. Further, after the contact plug 361 is used to some extent, the contact plug 361 can be removed from the cover 31 and the new contact plug 361 can be attached to the cover 31, and thus contamination of the workpiece W due to foreign matter accumulated on the contact plug 361 can be suppressed.

A cutting machining technique for measuring, in advance, a length of the tool 20 outside a machining region of a cutting machining device before the tool 20 is used, calculating a relative distance from an initial position of the tip portion of the tool 20 when the tool 20 is installed on a head of the cutting machining device, based on the measurement value, and performing machining on the workpiece W, based on the calculated relative distance, is conceivable. However, in this case, when the tool 20 is installed on the head, an error in an installation position of the tool 20 with respect to the head occurs. Thus, machining accuracy of the workpiece W in this case is about ±0.1 mm at most. Meanwhile, a screw manufactured by using his/her own bone of a patient and a prosthetic object for filling in a bone defect portion have a higher degree of fixity when the screw and the prosthetic object have greater matching accuracy with a portion in which the screw and the prosthetic object are fit. Thus, greater machining accuracy is desired, and machining accuracy from about ±0.01 mm to ±0.001 mm is required to be achieved. In contrast, it is conceivable to directly measure a relative distance from an initial position of the tip portion of the tool 20 by using an optical non-contact tool length measurement device using laser. However, in this method, in order to provide the tool length measurement device, rigidity of a housing of a cutting machining device needs to be increased, and the housing needs to be increased in size since the tool length measurement device needs to be housed in the housing. Thus, there is a risk that an installation space of the cutting machining device cannot be secured in a place such as, for example, an operating room where various pieces of medical equipment are present. In contrast, the cutting machining device 1 according to the present embodiment calculates a relative distance for the tool 20 by using the touch sensor 61 that detects contact of the tip portion of the tool 20 with the contact plug 361. In this way, the tool length measurement device as described above is unnecessary, and the housing 10 can be reduced in size.

Further, the contact plug 361 according to the present embodiment is supported by the elastic support 362 fit in the first opening 311*a* of the cover 31, and includes the plug main body 3612, and the contact portion 3611 provided on one end portion in the longitudinal direction of the plug main body 3612. Then, the elastic support 362 includes the support main body 3621 in which the plug main body 3612 is inserted and that is fit in the first opening 311*a* of the cover 31, and the outer flange portion 3622 that protrudes from the support main body 3621 and is engaged with the outer circumferential portion of the first opening 311*a* of the cover 31. In this way, the elastic support 362 hermetically seals between the contact plug 361 and the first opening 311*a* of the cover 31, and thus foreign matter present inside the cover 31 can be prevented from entering the machining region S1 around the cover 31 through a gap between the first opening 313*a* and the contact plug 361.

Furthermore, the touch sensor 61 according to the present embodiment is disposed in a position that faces the first opening 311*a* of the cover 31 inside the cover 31 and comes into contact with the contact plug 361 in a state where the tip portion of the tool 20 is in contact with the contact plug 361. In this way, a relative distance for the tool 20 can be calculated without exposing the touch sensor 61 to the outside of the cover 31, and thus a degree of cleanliness of the machining region S1 outside the cover 31 can be maintained.

Further, the holding unit 3 according to the present embodiment includes the tool holding unit 33 that holds the tool 20 inside the cover 31. Then, the cover 31 has the second opening 311*b* through which the tool 20 is inserted in the position separated from the fixed section of the workpiece holding portion 32 in the surrounding wall of the cover 31 and the first opening 311*a*, and includes the partition wall 313 that separates, from another region inside the cover 31, the preset tool holding region S2 around the second opening 311*b* inside the cover 31. In this way, the tool 20 installed on the main rotating shaft 52 of the head 5 can be successively replaced with the tool 20 held by the tool holding unit 33 of the cover 31, and thus a relative distance for each of the plurality of tools 20 held by the tool holding unit 33 can be continuously calculated. Therefore, production efficiency in the cutting machining device 1 can be increased.

Furthermore, the holding unit 3 according to the present embodiment includes the support member 34 that supports the touch sensor 61 via the sensor support portion 35, and detachably supports the cover 31 at another end portion in the longitudinal direction of the second section 311. In this way, sterilization treatment can be performed by regularly removing the cover 31 from the cutting machining device 1, and thus there is an advantage that a degree of cleanliness of the machining region S1 can be easily maintained. Further, the holding unit 3 according to the present embodiment includes the rotation driving motor 81 that rotates and drives the support member 34 about the B-axis JB. Then, the controller 100 controls the rotation driving motor 81 in such a way as to rotate the support member 34 and the cover 31 in such a way that the side wall 311*c* of the cover 31 is located on the head 5 side when the tip portion of the tool 20 is brought into contact with the contact plug 361, and to rotate the support member 34 and the cover 31 in such a way that the side wall 311*d* of the cover 31 is located on the head 5 side when the tool 20 fixed to the head 5 is replaced with the tool 20 held by the tool holding unit 33. In this way, the cover 31 that holds the contact plug 361 and the tool holding unit 33 can be reduced in size, and thus the cutting machining device 1 can be reduced in size.

Figure 12A:
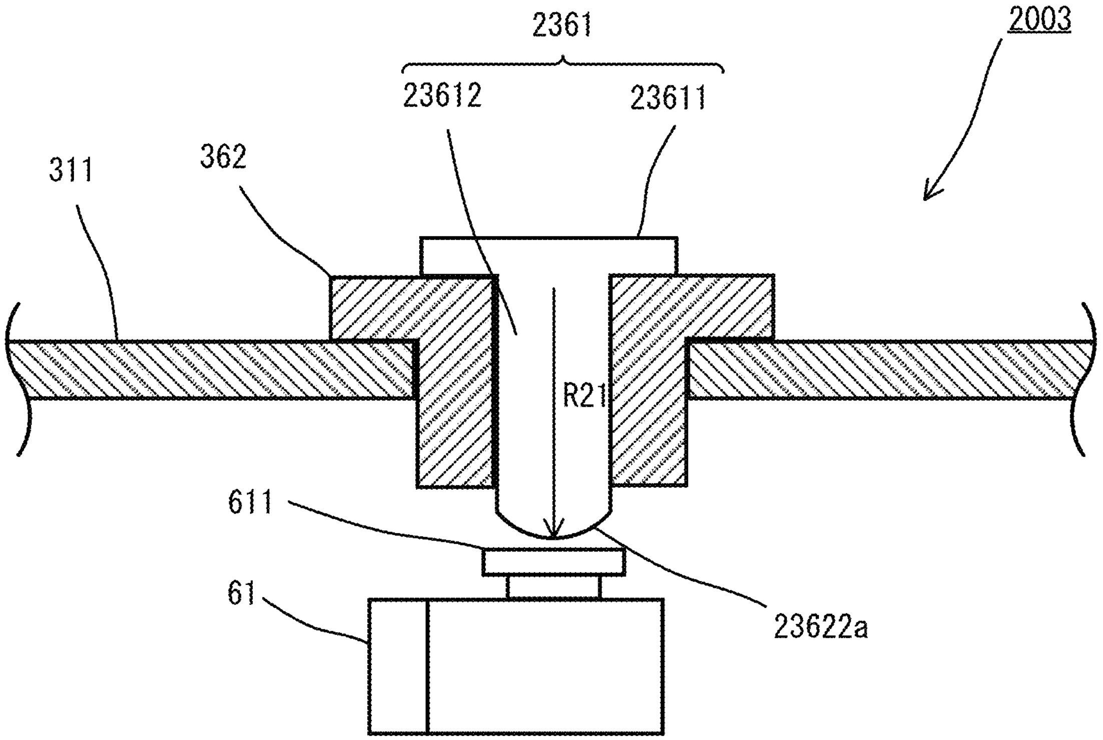
FIG. 12A is a cross-sectional view of a part of a holding unit according to a modification example.
Figure 12B:
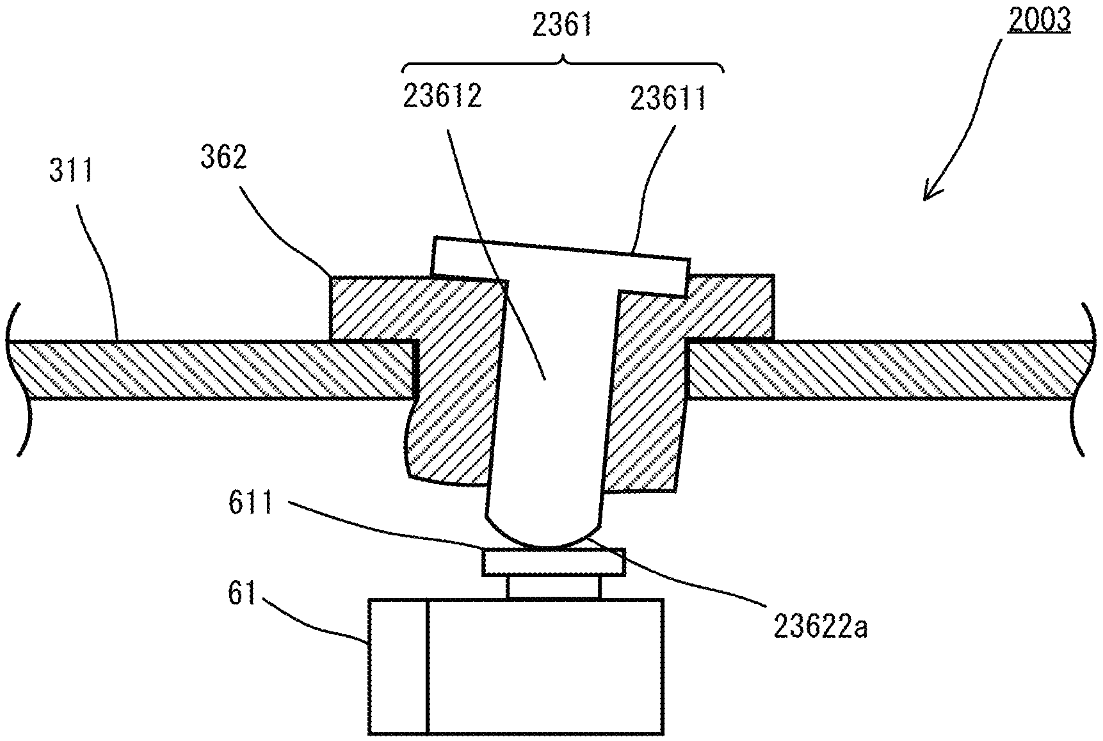
FIG. 12B is a cross-sectional view of a part of the holding unit according to the modification example illustrating a state where a tip portion of a tool is in contact with a contact plug.

Although the embodiments of the present disclosure have been described above, the present disclosure is not limited to the configuration of the embodiments described above. For example, as illustrated in FIG. 12A, an end portion 23622*a* on a side opposite to a contact portion 23611 side in a plug main body 23612 of a contact plug 2361 of a holding unit 2003 may have a spherical surface shape having a curvature radius R21. For example, as illustrated in FIG. 12B, even when the contact plug 2361 is pushed down by the tool 20 in a state where a central axis of the plug main body 23612 is inclined to the vertical direction, a distance between a surface of the end portion 23622*a* having the spherical surface shape and the detector 611 of the touch sensor 61 is the same as that when the contact plug 2361 is not inclined.

According to the present configuration, even when the contact plug 2361 being inclined is pushed down, a distance between the contact plug 2361 and the detector 611 of the touch sensor 61 is the same as that when the contact plug 361 not being inclined is pushed down. Therefore, an error in a relative distance for the tool 20 being calculated by the calculator 114 due to an inclination of the contact plug 2361 can be reduced.

Figure 13:
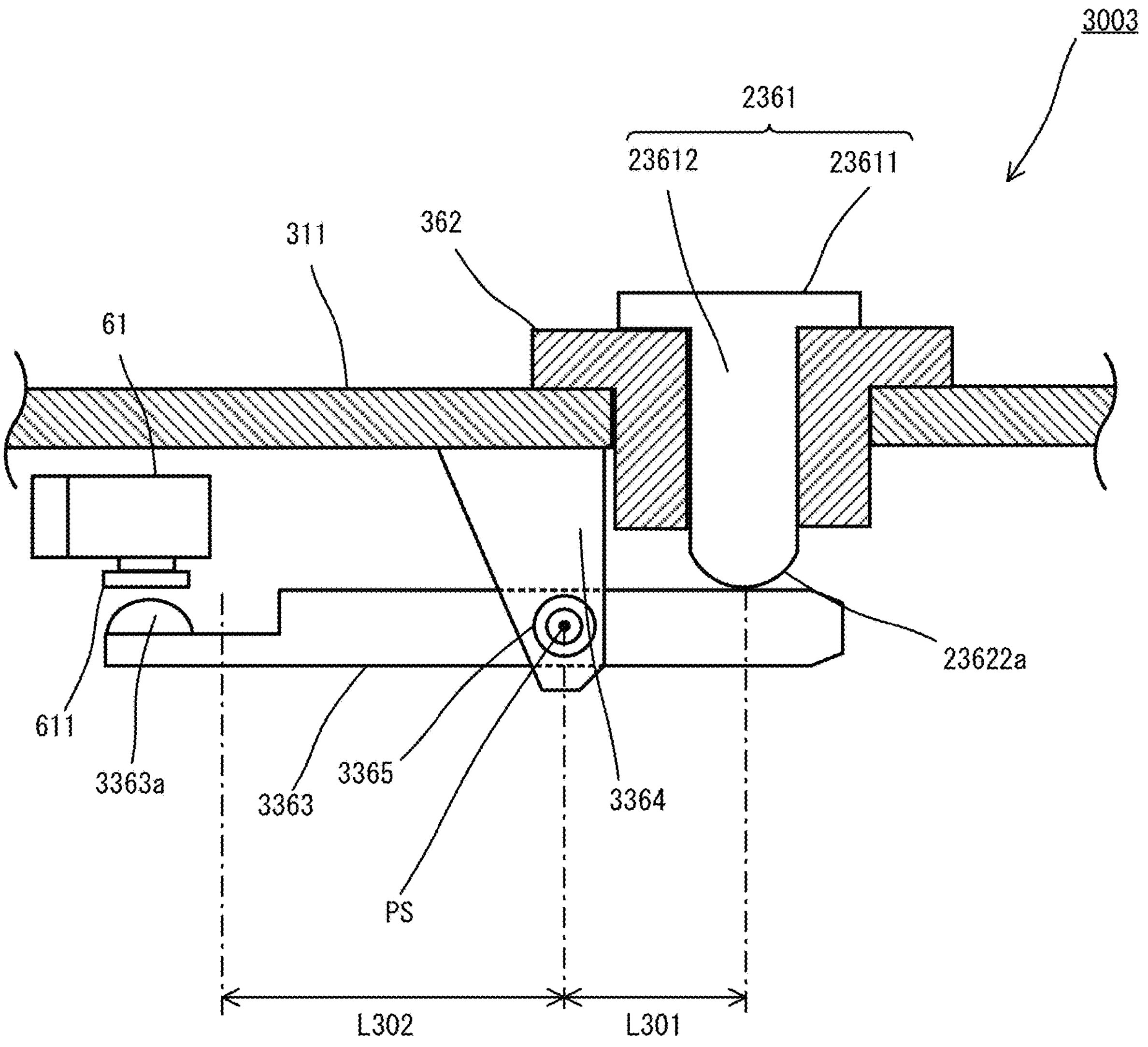
FIG. 13 is a cross-sectional view illustrating a part of the holding unit according to the modification example.

In the present embodiment, the example in which the touch sensor 61 is disposed to face the first opening 311*a* of the cover 31 is described, but a position of the touch sensor 61 is not limited to this. For example, the detector 611 of the touch sensor 61 may be disposed in a position separated from the first opening 311*a* of the cover 31. In this case, for example, as illustrated in FIG. 13, a holding unit 3003 may include an arm 3363 that is long and is disposed in a position in which one end portion in the longitudinal direction faces the first opening 311*a* inside the cover 31 and the contact plug 2361 comes into contact in a state where the tip portion of the tool 20 is in contact with the contact plug 2361, and an arm support portion 3364 that swingably supports the arm 3363 by a shaft portion 3365. Note that, in FIG. 13, a configuration similar to that in the modification example described above has the same reference sign as that in FIG. 12A. Further, the touch sensor 61 may be disposed in a position that faces another end portion of the arm 3363 and comes into contact with a protrusion 3363*a* provided on the another end portion of the arm 3363 in a state where the contact plug 361 is in contact with the one end portion of the arm 3363. Herein, a distance L301 from the one end portion of the arm 3363 to a swinging fulcrum PS of the arm 3363 is shorter than a distance L302 from the another end portion of the arm 3363 to the swinging fulcrum PS of the arm 3363. In this way, a displacement amount of the one end portion of the arm 3363 by being pushed down by the contact plug 2361 is amplified to about L302/L301 times in the another end portion on the touch sensor 61 side.

According to the present configuration, the touch sensor 61 performs detection in a state where the displacement amount of the contact plug 2361 is amplified, and thus contact of the tip portion of the tool 20 with the contact plug 2361 can be detected with excellent sensitivity.

In the embodiment, the example in which the second opening 311*b* through which the tool 20 is inserted is formed in the side wall 311*d* of the second section 311 of the cover 31 is described. However, the embodiment is not limited to this, and, for example, a second opening through which the tool 20 is inserted may be formed in both of the side walls 311*c* and 311*d* of the second section 311 of the cover 31 or in the side wall 311*d*. Alternatively, a second opening may be formed in another side wall along the longitudinal direction of the second section 311 other than the side walls 311*c* and 311*d* in the second section 311 of the cover 31. In these cases, the tool holding unit 33 that holds the tool 20 may be disposed in each position corresponding to the portion in which the second opening is formed in the second section 311, and a partition wall surrounding each tool holding unit 33 may be disposed inside the second section 311.

Although the embodiments and the modification examples of the present disclosure have been described above, the present disclosure is not limited to them. The present disclosure includes the embodiments and the modification examples being appropriately combined and also the embodiments and the modification examples being appropriately added with modifications.

This application claims the benefit of Japanese Patent Application No. 2021-180963, filed on Nov. 5, 2021, the entire disclosure of which is incorporated by reference herein.

INDUSTRIAL APPLICABILITY

The present disclosure is suitable as a cutting machining device that performs cutting machining of a bone.

REFERENCE SIGNS LIST

1 Cutting machining device
3, 2003 Holding unit
5 Head
10 Housing
10*a*, 313 Partition wall
10*b* Opening
20 Tool
31 Cover
32 Workpiece holding portion
33, 53 Tool holding unit
34 Support member
35 Sensor support portion
41 Base
43 Bracket
44 Raising and lowering driving motor
51 Main shaft driving motor
52 Main rotating shaft
61 Touch sensor
71 X-direction driving motor
76 Y-direction driving motor
81, 86 Rotation driving motor
82 Hollow shaft
82*a* Insertion hole
100 Controller
101 CPU unit
102 Main storage
103 Auxiliary storage
105 Input unit
106 Interface
107*a*, 107*b*, 107*c*, 107*d*, 107*e*, 107*f*, 107*g* Driving circuit
108 Detection circuit
109 Bus
111 Main shaft rotation controller
112 Raising and lowering controller
113 Horizontal movement controller
114 Calculator
115 B-axis rotation controller
116 C-axis rotation controller
117 Tool holding controller
131 Initial position storage
132 Position storage
311 Second section
311*a* First opening
311*b* Second opening
311*c*, 311*d* Side wall
312 First section
361, 2361 Contact plug
362 Elastic support
421, 721, 771 Rail
422, 722, 772 Slider
611 Detector
3363 Arm
3363*a* Protrusion
3364 Arm support portion
3365 Shaft portion
3611, 23611 Contact portion
3612, 23612 Plug main body
3621 Support main body
3622 Outer flange portion
23622*a* End portion
Pos0 Initial position
Pos1 Contact position
PosT0, PosT1, PosT2, PosT3 Tool holding position
JB B-axis
JC C-axis
L6 Signal line
W Workpiece

The invention claimed is:

1. A cutting machining device comprising:
a head to which one first tool is fixed;
a holding unit that is disposed to face the head and holds a workpiece; and
a controller that controls a movement of the head and the holding unit, wherein
the holding unit includes
a workpiece holding portion that holds the workpiece,
a contact plug that a tip portion of the first tool fixed to the head is contactable,
a cover having a box shape, including a surrounding wall to which the workpiece holding portion is fixed, and having a first opening in which the contact plug is detachably held in a position separated from a fixed section to which the workpiece holding portion in the surrounding wall is fixed, and
a touch sensor that detects contact of a tip portion of the first tool with the contact plug, and
the controller includes a calculator that calculates a machining start position when cutting machining is performed on the workpiece by the first tool, based on a preset initial position of the head and a contact position of the head, which is detected by using the touch sensor, when the tip portion of the first tool comes into contact with the contact plug.

2. The cutting machining device according to claim 1, wherein the contact plug includes a long plug main body supported by an elastic support fit in the first opening, and a plate-shaped contact portion that is provided on one end portion in a longitudinal direction of the plug main body and comes into contact with the tip portion of the first tool, and
the elastic support includes a support main body that has a cylindrical shape and is fit in the first opening, and an outer flange portion that protrudes from one end portion on the contact portion side in a cylindrical shaft direction of the support main body in a direction orthogonal to the cylindrical shaft direction and away from the cylindrical shaft and is engaged with an outer circumferential portion of the first opening.

3. The cutting machining device according to claim 2, wherein an end portion on a side opposite to the contact portion side in the plug main body has a spherical surface shape.

4. The cutting machining device according to claim 3, wherein the touch sensor is disposed in a position that faces the first opening inside the cover and comes into contact with the contact plug in a state where the tip portion of the first tool is in contact with the contact plug.

5. The cutting machining device according to claim 3, wherein the holding unit further includes an arm that is long and is disposed in a position in which one end portion in the longitudinal direction faces the first opening inside the cover and the contact plug comes into contact in a state where the tip portion of the first tool is in contact with the contact plug, and an arm support portion that swingably supports the arm, the touch sensor is disposed in a position that faces another end portion of the arm and comes into contact with the another end portion of the arm in a state where the contact plug is in contact with the one end portion of the arm, and a distance from the one end portion of the arm to a swinging fulcrum of the arm is shorter than a distance from the another end portion of the arm to the swinging fulcrum of the arm.

6. The cutting machining device according to claim 2, wherein the touch sensor is disposed in a position that faces the first opening inside the cover and comes into contact with the contact plug in a state where the tip portion of the first tool is in contact with the contact plug.

7. The cutting machining device according to claim 2, wherein the holding unit further includes an arm that is long and is disposed in a position in which one end portion in the longitudinal direction faces the first opening inside the cover and the contact plug comes into contact in a state where the tip portion of the first tool is in contact with the contact plug, and an arm support portion that swingably supports the arm, the touch sensor is disposed in a position that faces another end portion of the arm and comes into contact with the another end portion of the arm in a state where the contact plug is in contact with the one end portion of the arm, and a distance from the one end portion of the arm to a swinging fulcrum of the arm is shorter than a distance from the another end portion of the arm to the swinging fulcrum of the arm.

8. The cutting machining device according to claim 2, wherein the holding unit further includes a tool holding unit that holds at least one second tool different from the first tool inside the cover, the cover has a second opening through which the second tool is inserted in a position separated from the fixed section in the surrounding wall and the first opening, and includes a partition wall that separates, from another region inside the cover, a preset tool holding region for holding the second tool around the second opening inside the cover, and the tool holding unit is disposed in the tool holding region and holds the second tool inserted through the second opening in the tool holding region.

9. The cutting machining device according to claim 8, wherein the cover includes a first section having a rectangular box shape, and a second section that has a hollow parallelepiped shape and is continued from the first section at one end portion in the longitudinal direction, the first opening is formed in a side wall along a longitudinal direction of the second section in the second section, the holding unit further includes a support member that supports the touch sensor via a sensor support portion, and detachably supports the cover at another end portion in the longitudinal direction of the second section, and a rotation driving motor that rotates and drives the support member about a rotation axis extending along the longitudinal direction of the cover, and the controller further includes a rotation controller that controls the rotation driving motor in such a way as to rotate the support member and the cover supported by the support member in such a way that the side wall having the first opening is located on the head side when the tip portion of the first tool is brought into contact with the contact plug, and to rotate the support member and the cover supported by the support member in such a way that the tool holding unit is located on the head side when the first tool fixed to the head is replaced with the second tool.

10. The cutting machining device according to claim 3, wherein the holding unit further includes a tool holding unit that holds at least one second tool different from the first tool inside the cover, the cover has a second opening through which the second tool is inserted in a position separated from the fixed section in the surrounding wall and the first opening, and includes a partition wall that separates, from another region inside the cover, a preset tool holding region for holding the second tool around the second opening inside the cover, and the tool holding unit is disposed in the tool holding region and holds the second tool inserted through the second opening in the tool holding region.

11. The cutting machining device according to claim 10, wherein the cover includes a first section having a rectangular box shape, and a second section that has a hollow parallelepiped shape and is continued from the first section at one end portion in the longitudinal direction, the first opening is formed in a side wall along a longitudinal direction of the second section in the second section, the holding unit further includes a support member that supports the touch sensor via a sensor support portion, and detachably supports the cover at another end portion in the longitudinal direction of the second section, and a rotation driving motor that rotates and drives the support member about a rotation axis extending along the longitudinal direction of the cover, and the controller further includes a rotation controller that controls the rotation driving motor in such a way as to rotate the support member and the cover supported by the support member in such a way that the side wall having the first opening is located on the head side when the tip portion of the first tool is brought into contact with the contact plug, and to rotate the support member and the cover supported by the support member in such a way that the tool holding unit is located on the head side when the first tool fixed to the head is replaced with the second tool.

12. The cutting machining device according to claim 1, wherein the touch sensor is disposed in a position that faces the first opening inside the cover and comes into contact with the contact plug in a state where the tip portion of the first tool is in contact with the contact plug.

13. The cutting machining device according to claim 12, wherein the holding unit further includes an arm that is long and is disposed in a position in which one end portion in the longitudinal direction faces the first opening inside the cover and the contact plug comes into contact in a state where the tip portion of the first tool is in contact with the contact plug, and an arm support portion that swingably supports the arm, the touch sensor is disposed in a position that faces another end portion of the arm and comes into contact with the another end portion of the arm in a state where the contact plug is in contact with the one end portion of the arm, and a distance from the one end portion of the arm to a swinging fulcrum of the arm is shorter than a distance from the another end portion of the arm to the swinging fulcrum of the arm.

14. The cutting machining device according to claim 12, wherein the holding unit further includes a tool holding unit that holds at least one second tool different from the first tool inside the cover, the cover has a second opening through which the second tool is inserted in a position separated from the fixed section in the surrounding wall and the first opening, and includes a partition wall that separates, from another region inside the cover, a preset tool holding region for holding the second tool around the second opening inside the cover, and the tool holding unit is disposed in the tool holding region and holds the second tool inserted through the second opening in the tool holding region.

15. The cutting machining device according to claim 14, wherein the cover includes a first section having a rectangular box shape, and a second section that has a hollow parallelepiped shape and is continued from the first section at one end portion in the longitudinal direction, the first opening is formed in a side wall along a longitudinal direction of the second section in the second section, the holding unit further includes a support member that supports the touch sensor via a sensor support portion, and detachably supports the cover at another end portion in the longitudinal direction of the second section, and a rotation driving motor that rotates and drives the support member about a rotation axis extending along the longitudinal direction of the cover, and the controller further includes a rotation controller that controls the rotation driving motor in such a way as to rotate the support member and the cover supported by the support member in such a way that the side wall having the first opening is located on the head side when the tip portion of the first tool is brought into contact with the contact plug, and to rotate the support member and the cover supported by the support member in such a way that the tool holding unit is located on the head side when the first tool fixed to the head is replaced with the second tool.

16. The cutting machining device according to claim 1, wherein the holding unit further includes an arm that is long and is disposed in a position in which one end portion in the longitudinal direction faces the first opening inside the cover and the contact plug comes into contact in a state where the tip portion of the first tool is in contact with the contact plug, and an arm support portion that swingably supports the arm, the touch sensor is disposed in a position that faces another end portion of the arm and comes into contact with the another end portion of the arm in a state where the contact plug is in contact with the one end portion of the arm, and a distance from the one end portion of the arm to a swinging fulcrum of the arm is shorter than a distance from the another end portion of the arm to the swinging fulcrum of the arm.

17. The cutting machining device according to claim 16, wherein the holding unit further includes a tool holding unit that holds at least one second tool different from the first tool inside the cover, the cover has a second opening through which the second tool is inserted in a position separated from the fixed section in the surrounding wall and the first opening, and includes a partition wall that separates, from another region inside the cover, a preset tool holding region for holding the second tool around the second opening inside the cover, and the tool holding unit is disposed in the tool holding region and holds the second tool inserted through the second opening in the tool holding region.

18. The cutting machining device according to claim 17, wherein the cover includes a first section having a rectangular box shape, and a second section that has a hollow parallelepiped shape and is continued from the first section at one end portion in the longitudinal direction, the first opening is formed in a side wall along a longitudinal direction of the second section in the second section, the holding unit further includes a support member that supports the touch sensor via a sensor support portion, and detachably supports the cover at another end portion in the longitudinal direction of the second section, and a rotation driving motor that rotates and drives the support member about a rotation axis extending along the longitudinal direction of the cover, and the controller further includes a rotation controller that controls the rotation driving motor in such a way as to rotate the support member and the cover supported by the support member in such a way that the side wall having the first opening is located on the head side when the tip portion of the first tool is brought into contact with the contact plug, and to rotate the support member and the cover supported by the support member in such a way that the tool holding unit is located on the head side when the first tool fixed to the head is replaced with the second tool.

19. The cutting machining device according to claim 1, wherein the holding unit further includes a tool holding unit that holds at least one second tool different from the first tool inside the cover, the cover has a second opening through which the second tool is inserted in a position separated from the fixed section in the surrounding wall and the first opening, and includes a partition wall that separates, from another region inside the cover, a preset tool holding region for holding the second tool around the second opening inside the cover, and the tool holding unit is disposed in the tool holding region and holds the second tool inserted through the second opening in the tool holding region.

20. The cutting machining device according to claim 19, wherein the cover includes a first section having a rectangular box shape, and a second section that has a hollow parallelepiped shape and is continued from the first section at one end portion in the longitudinal direction, the first opening is formed in a side wall along a longitudinal direction of the second section in the second section, the holding unit further includes a support member that supports the touch sensor via a sensor support portion, and detachably supports the cover at another end portion in the longitudinal direction of the second section, and a rotation driving motor that rotates and drives the support member about a rotation axis extending along the longitudinal direction of the cover, and the controller further includes a rotation controller that controls the rotation driving motor in such a way as to rotate the support member and the cover supported by the support member in such a way that the side wall having the first opening is located on the head side when the tip portion of the first tool is brought into contact with the contact plug, and to rotate the support member and the cover supported by the support member in such a way that the tool holding unit is located on the head side when the first tool fixed to the head is replaced with the second tool.

* * * * *